(12) United States Patent
Singh

(10) Patent No.: US 12,437,487 B2
(45) Date of Patent: Oct. 7, 2025

(54) SYSTEMS AND METHODS FOR VIRTUALLY DISPLAYING CONTENT ITEMS ON REAL-WORLD OBJECTS IN AN EXTENDED REALITY ENVIRONMENT

(71) Applicant: Adeia Guides Inc., San Jose, CA (US)

(72) Inventor: Mona Singh, Cary, NC (US)

(73) Assignee: Adeia Guides Inc., San Jose, CA (US)

( * ) Notice: Subject to any disclaimer, the term of this patent is extended or adjusted under 35 U.S.C. 154(b) by 171 days.

(21) Appl. No.: 18/376,367

(22) Filed: Oct. 3, 2023

(65) Prior Publication Data
US 2025/0111619 A1    Apr. 3, 2025

(51) Int. Cl.
*G06T 19/00*    (2011.01)
(52) U.S. Cl.
CPC ................. *G06T 19/006* (2013.01)
(58) Field of Classification Search
None
See application file for complete search history.

(56) References Cited

U.S. PATENT DOCUMENTS

| | | |
|---|---|---|
| 10,930,082 B2 | 2/2021 | Singh |
| 11,276,375 B2 | 3/2022 | Singh |
| 11,288,878 B2 | 3/2022 | Singh |
| 2017/0185596 A1 | 6/2017 | Spirer |
| 2018/0322706 A1 * | 11/2018 | Drouin ............... G06F 3/011 |
| 2019/0188435 A1 | 6/2019 | Davis et al. |

* cited by examiner

*Primary Examiner* — Nicholas R Wilson
(74) *Attorney, Agent, or Firm* — Haley Guiliano LLP

(57) ABSTRACT

Systems and methods are described for placing digital content items on trigger objects in an extended reality (XR) environment based on their relative prominence. The system receives an input of a live real-world view that is visible via the XR device, which includes a plurality of trigger objects at varying distances and angles, and obtains attributes related to the trigger objects in the live real-world view. Trigger objects' prominence, vantage, and adjusted prominence values, along with any handicaps and restrictions on content item placements, are collectively considered. Comparing the values between two or more trigger objects, a selection of at least one trigger object is made. Barring any safety concerns or placement restrictions, the content item that is designated for the selected trigger object is placed, such as overlayed, on the selected trigger object.

20 Claims, 22 Drawing Sheets

| Trigger object | Restriction | Restriction details |
|---|---|---|
| Mercedes Benz | Partial restriction | - If a car ad, then only Mercedes<br>- No competing products<br>- Car accessories approved |
| Jonny shoes | None | Approved for any ad display |
| Prada bags | Complete restriction | No content items/ads allowed |
| John's movie theatre | Partial restriction | Content items/ads only between hours of 7PM-9PM |

FIG. 8

| | Offer | Viewing Distance | Subtended angle | Area of object | Prominence | Handicap | Adjusted prominence | Notional bid |
|---|---|---|---|---|---|---|---|---|
| Scale factor | 1000 | | | | | | | |
| Inputs | | | | | | | | |
| 1505 | | | | | | | | 1520 |
| Object C | 18 | 14 | 80 | 8 | 3 | 7.14 | 1.73 | 4.12 | 74.23 |
| Object A — 1510 | 1545 — 8 | 10 | 40 | 15 | 17 | 37.50 | 4.12 | 9.10 | 72.76 — 1525 |
| Object B | 3 | 7 | 30 | 12 | 5 | 57.14 | 2.24 | 25.56 | 76.67 |
| 1515 | 1540 | | | | | | | | 1530 |

Auction results with proposed winner selection and winning price

| | |
|---|---|
| Winner (one with the highest notional bid) | Object B — 1535 |
| Winner's offer | 3 |
| Bid increment | 0.01 |
| Second-highest notional bid | 74.23 |
| Price to beat (second highest notional bid divided by winner's adjusted prominence) | 2.905 |
| Winning price | 2.91 |

Alternative auction results with traditional winning price

| | |
|---|---|
| Winner | Red |
| Winner's offer | 3 |
| Bid increment | 0.01 |
| Second-highest offer | 8.00 |
| Price to beat | 8.00 |
| Winning price | 3.00 |

SYSTEMS AND METHODS FOR VIRTUALLY DISPLAYING CONTENT ITEMS ON REAL-WORLD OBJECTS IN AN EXTENDED REALITY ENVIRONMENT

FIELD OF DISCLOSURE

Embodiments of the present disclosure relate to providing digital content in an extended reality (XR) environment based on relative prominence of trigger objects visible in a field of view of an XR device. Various embodiments relating to analyzing requests from different content providers to insert content in the XR environment, and selecting, for insertion, content based on parameters, such as prominence, handicap adjustments, and value-related factors are included.

BACKGROUND

Providing digital content in both the real world and the virtual has been and continues to become more and more competitive, as each content provider looks for creative ways to grab a user's attention and deliver content that is relevant to the user.

In the real world, if a user searches for a product on the internet, the search details are sold to an advertising company such that they may deliver ads that are relevant to the user's search. Advertising companies provide ads not only for products a user searched for but also for any other product they deem may be relevant to the user. For example, if a user purchased a product on a site such as Amazon, the shopping site will display other products that may or may not be directly related, for example, under a title such as: "You may also be interested in . . . ."

Other advertising methods, such as on the web, include advertisers buying ad words. This is common to do on Google™, Facebook™, and other platforms. When a user performs a search that includes a word that matches some ad word, a real-time auction is conducted, and a corresponding ad is shown to the user.

Variations of the ad words approach exist in which, for example, even if the user does not explicitly perform a search, ads are delivered to the user based on the text content of webpages that the user is visiting.

In the virtual world, digital content placement, such as overlaying of supplemental content on or near objects, has become common. Digital content such as an ad may be placed by advertisers on objects to attract users. In a virtual gaming environment, ads appear in a section of the virtual game while the user continues to play the virtual game.

Although several content and ad placement tools and techniques exist, these methods are not tailored to the extended reality world. For example, current methods may have an ad tied to a geospatial location on the screen. Since the scene or the objects in the extended reality world are not fixed, tying virtual ads to geospatial locations that are fixed may not be useful.

For techniques that do exist in the extended reality world, such as overlaying of supplemental content, the overlayed supplemental content is presented in a fixed size frame to the user. Such presentations are ineffective since they do not consider factors relating to the user's direction of view.

As such, there is a need for systems and methods for determining effective content item placement in the extended reality world.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 8 is an example of a table of restriction details associated with trigger objects, in accordance with some embodiments of the disclosure;

FIG. 15 is an example of a calculation performed to determine a winning trigger object and a winning bid price, in accordance with some embodiments of the disclosure;

FIG. 16 is an example where a bid price is increased in order to be selected as the winning bid, in accordance with some embodiments of the disclosure.

DETAILED DESCRIPTION

Figure 1A:
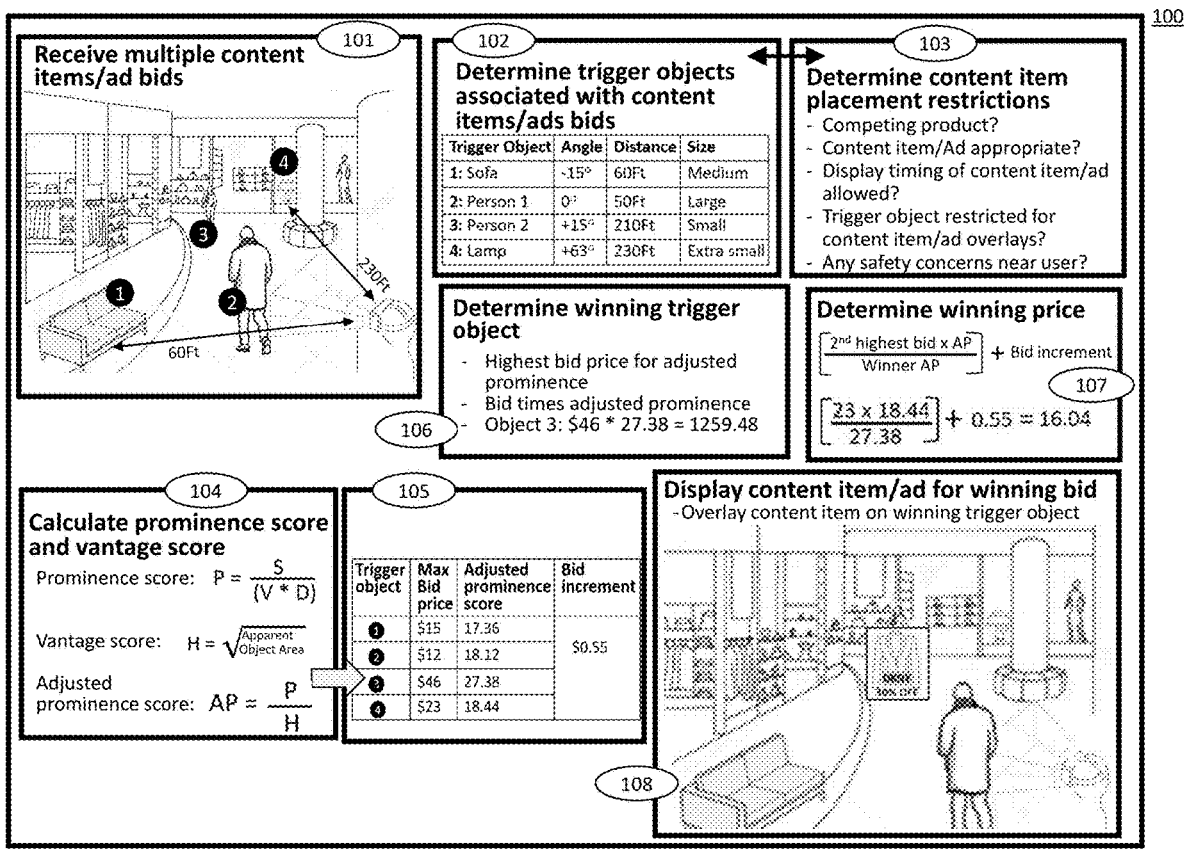
FIG. 1A is a block diagram of a process for selecting a trigger object and placing a digital content item on the trigger object in an XR bidding environment, in accordance with some embodiments.

In accordance with some embodiments disclosed herein, some of the above-mentioned limitations are addressed by selecting real-world objects viewable in a field of view of an extended reality (XR) device based on one or more factors to virtually overlay content items on the selected real-world objects in an XR environment. Some of the factors used in selecting the real-world objects includes a real-world object's prominence score, vantage score, and adjusted prominence score, and the prominence score, vantage score, and adjusted prominence score of other real-world objects that are also in the field of view of the XR device. For example, the content item may be an ad, and the ad may be virtually placed on a real-world object on a screen of the XR device. In another example, the process of selecting the real-world object, also referred to herein as the trigger object, may be based on bids provided by content providers to display an ad on the trigger object. Although ads are often discussed herein as the digital content to be placed on real world objects, i.e., trigger objects, it is understood that any digital content can be placed on objects in the XR FOV.

In some embodiments, the methods include receiving an input of a live image via a camera of an XR device. The XR device includes augmented reality (AR) devices, such as headsets, glasses, mobile phones, virtual reality (VR) devices, or other wearable devices, that may be used to perform the processes described herein. The live image may be received when a live input feed is obtained via the XR device, such as AR glasses or headset, viewfinder of a mobile phone, or a camera associated with a vehicle taking in live input of the road ahead. The live image is a real-world image that is visible in real time through the field of view of the AR Device. The live image is also referred to herein as the scene or live input. The live image may be viewed via a display associated with the XR device, such as in a pass-through mode via a screen of the AR device. The live image may include a plurality of objects, among which a certain number of objects may be selected as trigger objects upon which to virtually place a digital content item. A trigger object, as used herein, may be any live object that is viewable in the FOV of the XR device. For example, a person, automobile, road sign, sofa, or any other object that has a surface on which a virtual image may be overlayed, and that is viewable in the FOV of the XR device, can potentially be selected as a trigger object.

In some embodiments, a first and a second trigger object, from among the plurality of trigger objects that can be seen via the pass-through screen of the XR device, may be identified. Only a subset of trigger objects, from all the potential real-world objects viewable in the FOV of the XR device, may be selected as trigger objects to not overwhelm a user of the XR device with too many virtual objects overlayed upon trigger objects.

Once the first and second trigger objects are identified, a first value associated with displaying a first digital content item overlayed on the first trigger object, and a second value associated with displaying a second digital content item over the second trigger object may be determined.

A first prominence score and a first vantage score for the first trigger object, and a second prominence score and a second vantage score for the second trigger object may also be determined. As used herein, the prominence score is a measure of how visible or "prominent" an object is in the FOV of the XR device. For example, an object that is front and center in the FOV of the XR device is more prominent than another object that is in the peripheral view within the FOV. As used herein, vantage score is associated with the size of the object. In other words, it is a factor that relates to size of the trigger object; "vantage" refers to "advantage based on its size." For example, a larger object is more visible due to its size, and as such has a vantage score that is higher than a smaller-size object, which is less visible as compared to the larger object.

Upon obtaining the prominence score and the vantage score of both the first and second trigger objects, a first adjusted prominence score for the first trigger object and a second adjusted prominence score for the second trigger object may be calculated. As referred to herein, the adjusted prominence score is a measure based on the prominence of a trigger object scaled down by the vantage score. The adjusted prominence score is calculated to provide a fairer measure than the prominence score by taking out what can be extraneous factors, such as the size of the trigger object.

In some embodiments, once the adjusted prominence scores for the first and second trigger objects are calculated, a selection of either the first or the second trigger object is made. The selection is based at least in part on the first adjusted prominence score, the second adjusted prominence score, the first value, and the second value. For example, the first trigger object may be selected based on the various values and scores mentioned above. The XR device is then controlled to display the first digital content item overlayed the selected first trigger object in the XR environment.

The display includes overlaying the first digital content item on the first trigger object, Prior to overlaying the first digital content item on the first trigger object, a determination may be made if the displaying/overlaying satisfies display restrictions. Some examples of the restrictions are described further in detail in the description of FIGS. 12 and 13. One such display restriction may involve analyzing safety risks prior to overlaying the first digital content item on the first trigger object. For example, in a setting where the user is wearing an AR device, or the AR device is integrated in an automobile to provide a heads-up display, a safety risk assessment may be performed to determine whether displaying the first digital content item on the first trigger object at a particular time would distract the driver in a way that would raise the risk of causing an accident. For example, if the driver is driving fast with crowded traffic surrounding the automobile, the system may wait until those safety risks are no longer in effect before overlaying the first digital content item on the first trigger object.

In one embodiment, the methods described above, which include selecting one or more trigger objects; calculating their value, prominence score, vantage score, and adjusted prominence score; and using the calculated values, at least in part, to select a trigger object for overlaying the digital content item, may be used in an auction/bidding setting. In such an auction/bidding embodiment, the system may receive at least two separate bids, wherein each bid identifies a separate trigger object and an upper limit of a bid. As referred to herein, bid, bid price, offer, offer price, are used interchangeably, and refer to the price that the digital content provider, such as the ad agency or advertiser, is willing to pay for placing their digital content item, such as an ad, on the selected trigger object. It may also include details and conditions associated with the placement of the digital content item on the selected trigger object. For example, it may indicate the type of content, the duration of content display and other content or placement details that form a complete proposal along with a bid price for placement of the digital content item on the selected trigger object.

These bids may be received from ad providers or other digital content providers. Once the bids are received, control circuitry of a system may obtain attributes associated with the trigger objects that are identified by the two separate bids for placing the digital content item, such as an ad. The control circuitry may use these attributes to calculate a prominence score for each identified trigger object.

Since objects vary in size, selection of a larger-size trigger object may provide a perceived "unfair" advantage to one digital content provider, such as an advertiser, over a second provider who selects a smaller-size trigger object. For example, a larger-size trigger object may be in the peripheral part of the FOV, and the smaller-size trigger object may be front and center of the FOV; however, simply due to its size, the larger-size trigger object that is in the peripheral view, or obstructed in part, may become more prominent. In other words, even though its peripheral and should be less prominent, it is prominent solely due to its large size and such advantage due to size alone may be deemed unfair. To remove such an advantage that makes the larger object prominent due to its size, the systems adjust for such a e size handicap to provide a more level or equitable playing field to all the digital content/ad providers. As referred to herein, handicap is used to cure the unfair advantage that one content provider may have over another by selecting a trigger object that is larger in size to make it more prominent. "Handicap" may also refer to adjusting any other unfair advantages that one digital content provider may get over the other to simply gain prominence, such as selecting an unobstructed trigger object to make the content more prominent. To remove this disadvantage (i.e., due to size) a vantage score that is based on size of the trigger object is calculated. The vantage score is then used in calculating an adjusted prominence score that removes size from being factored into the selection of a winning trigger object, i.e., removing the handicap.

The digital content provider, such as an advertiser or another type of content provider, may identify which trigger object is of interest for overlaying a digital content item, such as an ad. As described earlier, although an ad and advertiser are used in a non-limiting example, the content item and the content provider may provide any type of content item. Once identified, the control circuitry may calculate the adjusted prominence score for each trigger object identified by an advertiser. A notional bid, which is a combination of the bid price and the adjusted prominence score, is calculated for each trigger object identified by the digital content provider, such as an advertiser. The control circuitry may compare all the notional bids and select a trigger object associated with the highest notional bid as the winning trigger object or, in other words, select a winning digital content provider, such as an advertiser.

The control circuitry may also calculate a winning bid for the winning trigger object. The winning bid may be the highest price offered in the bid or it may be less than the upper limit bid that was offered by the digital content provider, such as the advertiser. The calculation for determining the winning bid (also referred to as bid price) may consider the second-highest bid price from another digital content provider, such as the advertiser, and the bid increment along with the winning trigger object's adjusted prominence score.

In some instances, the trigger object on which the ad is to be placed may have rules and policies that restrict placement of the ad altogether or may allow ad placement subject to the rules and restrictions. The control circuitry determines whether the ad that is to be placed on the winning trigger object would comply with any such rules and policies.

The control circuitry also evaluates safety risks associated with placement of the content item (e.g., ad) on the trigger object. For example, placing the content item may divert the user's attention from an activity they are performing, such as walking, running or driving a car, which could cause injury to the user or others. If such a safety risk is assessed, the ad is either not placed, put on hold, or placed after the safety risk clears.

Once the winning trigger object has been identified, the winning bid price for the winning trigger object is determined, a confirmation is made that any rules and policies that restrict placement of the ad have been followed, and safety risks are cleared, the ad or other digital content for the winning trigger object is placed on the winning trigger object. The ad placement may include overlaying the ad on the trigger object or blending the ad within the surface area of the winning trigger object. The ad placement may also include placing the ad within a predetermined distance from the winning trigger object, such as a predetermined distance or angle in the field of view from the winning trigger object. The control circuitry may then automatically invoice the advertiser or other content provider for the winning bid price after the ad has been placed on the winning trigger object or at any time once the winning trigger object has been selected.

Turning to the figures, FIG. 1A is a block diagram of an example of a process 100 for selecting a trigger object and placing a digital content item on the trigger object in an XR bidding environment, in accordance with some embodiments. The process may be used, for example, to determine a winning bid for a winning trigger object in an AR bidding environment. The process 100 may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3) as one or more instructions or routines that may be executed by a corresponding device or system to implement the process 100.

Figure 4:
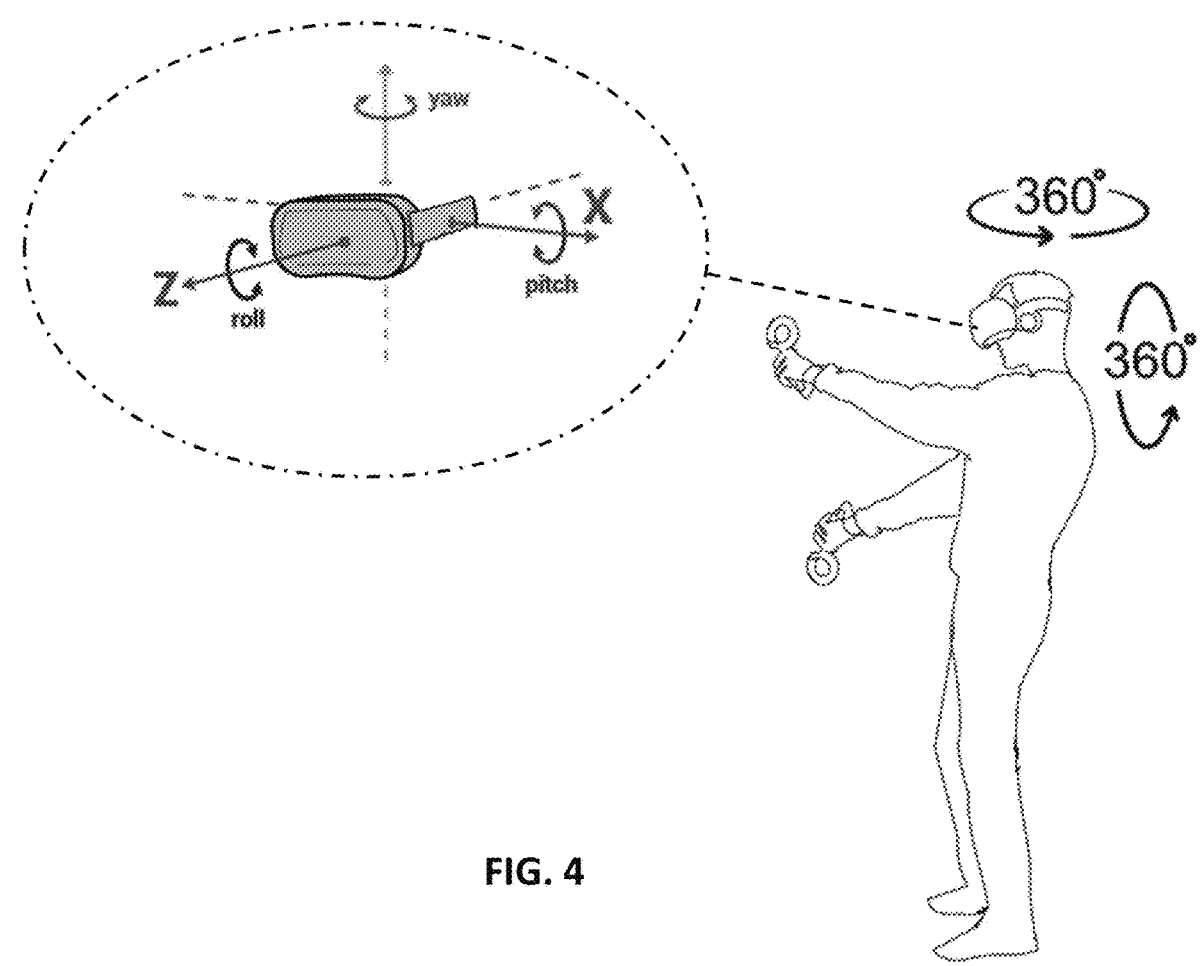
FIG. 4 is a block diagram of a generalized XR headset device for using in an AR bidding environment, in accordance with some embodiments of the disclosure.

In some embodiments, an augmented reality (AR) equipment device, such as the AR headset depicted in FIG. 4, may be used by a user to view their surroundings. In this embodiment, a live image is viewed through a display of the AR electronic device. The AR electronic device includes a camera that is connected either directly or wirelessly to a display and has capability to have an input of a live image of a real-world scene that is viewable through the FOV of the camera. The AR electronic device may be a wearable device, such as smart glasses with control circuitry 220 and/or 228, that allows the user to see through a transparent glass to view objects in its FOV. In another embodiment, the AR electronic device may be a mobile phone having a camera and a display to intake the live feed input and display it on a display screen of the mobile device. The AR electronic device mentioned may, in some embodiments, include both a front-facing or inward-facing camera and an outward-facing camera. The front-facing or inward-facing camera may be directed at the user of the device, while the outward-facing camera may capture the live images in its FOV.

In another embodiment, the process may use other types of hardware to view its surroundings. For example, the equipment used to view its surroundings may be a camera associated with an autonomous car. The automobile may be a gas-powered car or an autonomous electric car, such as a Tesla Model S, that includes a plurality of cameras embedded in the outer body of the car. The plurality of cameras may be on all sides of the car, such as in front, on the sides, and in the back. The cameras in the front of the car, such as on the side of the hood of the car, may capture a live image of objects in the real world that are in front of the car. The same objects may also be seen by a user who is sitting in the driver's or the front passenger seat and viewing through their front windshield.

In yet other embodiments, the equipment may be an internet of things (IoT) device that includes a camera, for example, a security IoT camera that has an input of a live scene that can be displayed on a display of a user's electronic device.

Figure 2:
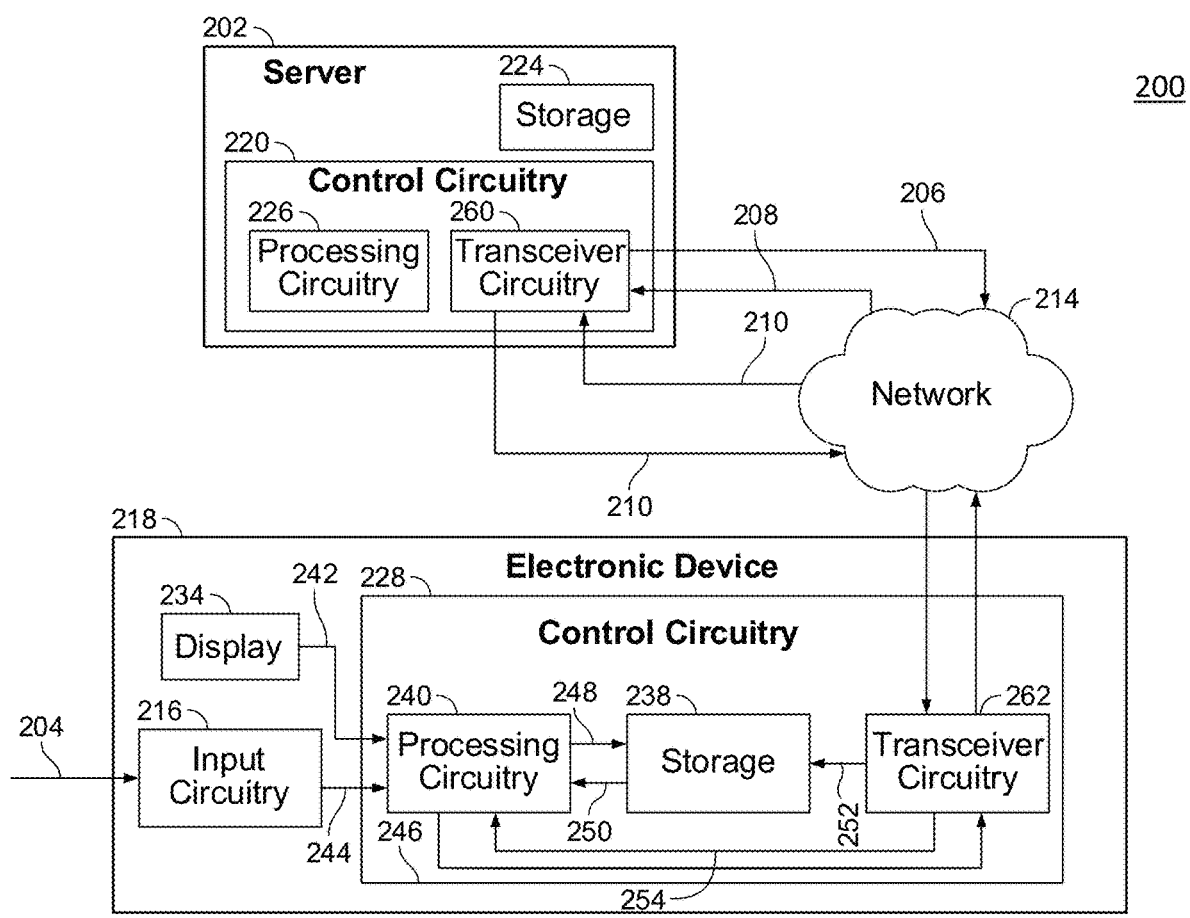
FIG. 2 is a block diagram of a system for determining a winning bid for a winning trigger object in an AR bidding environment, in accordance with some embodiments of the disclosure.

At block 101, the control circuitry of a system, such as control circuitry 220 and/or 228 of the system of FIG. 2, may receive a first bid and a second bid. The bids may be received from a content provider such as an advertiser, an advertising platform, an ad agency, an ad server, a platform related to ads, a store, or any other content provider. The bid may include a price for displaying an ad on a trigger object selected by the advertiser. For example, as depicted in block 101, an advertiser may select any one or more of select trigger objects (sofa, person 1, person 2, lamp, etc.) for displaying their ad. The bid may also specify which trigger object that is in the field of view (FOV) of a user via their AR electronic device is selected for displaying the ad.

Figure 3:
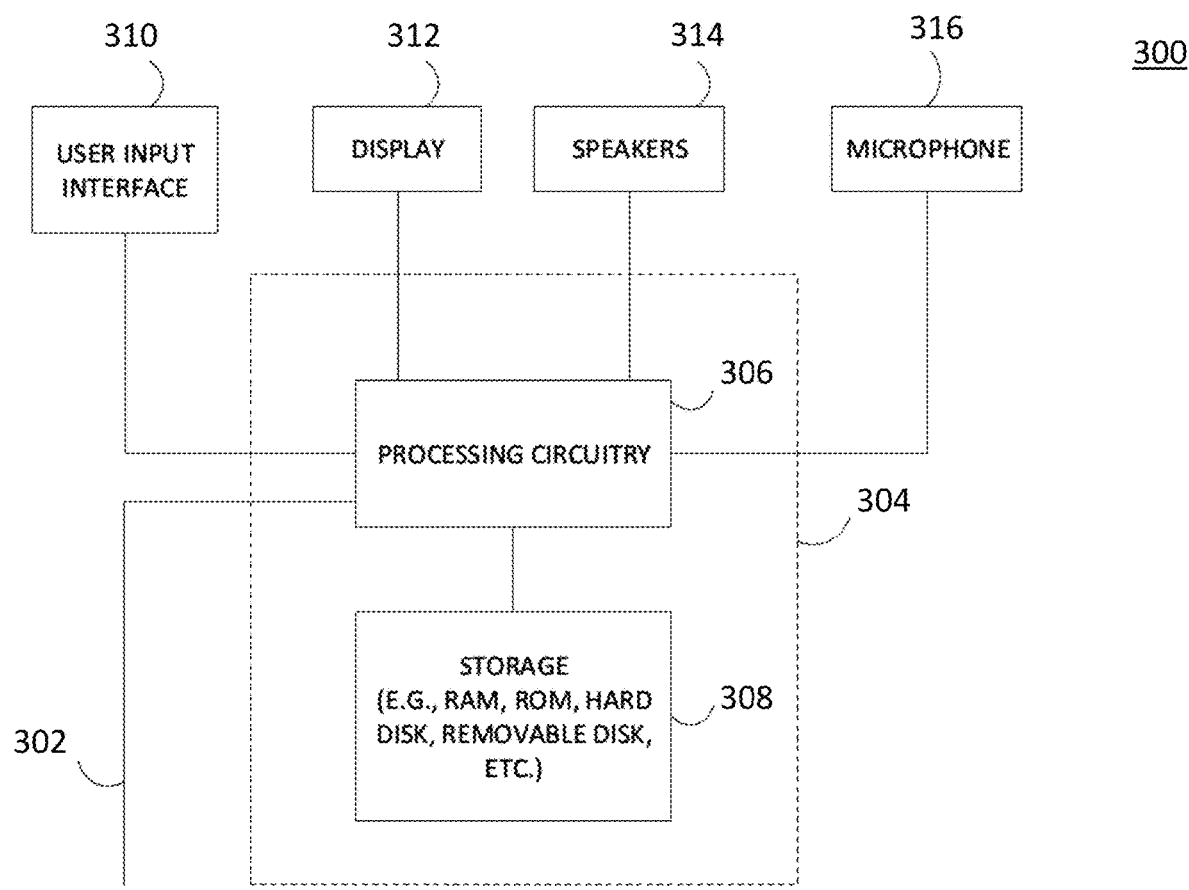
FIG. 3 is a block diagram of a generalized electronic XR device for using in an AR bidding environment, in accordance with some embodiments of the disclosure.

The trigger object selected may be any object in the FOV of the user via their AR electronic device, such as the AR electronic device of FIG. 3. The trigger object selected may also be any object in the FOV of a camera of an automobile that is also visible to a driver or passenger of that automobile via their dashboard windshield or via a display in the automobile, such as the display used for navigation or climate control.

The trigger object is also any object with respect to which an advertising offer is associated. A trigger object may be specified in a way that is suitable for an object recognizer to work on, i.e., it may be specified in a format recognized by the object recognizer. The specification of an object may be based on its appearance or based on its type (with the appearance determined based on another knowledge source). For example, a Honda Accord may be specified by listing various images of it or by saying "2022 Honda Accord EX-L," where the images can be retrieved from another source.

Although references will be made to an AR electronic device in the embodiments herein, the embodiments are not so limited and can be applied to any camera and display combination in which a live image can be inputted by another camera and displayed on the display screen of a device.

Some examples of trigger objects include a storefront; a billboard; a blank wall; a person; an object such as a lamp, car, traffic light, highway sign, or side of a bus: basically, any surface that is visible via the AR electronic device. Trigger objects may be stationary objects or moving objects. Trigger objects may also be objects that are permanent or objects that are visible only for a short period of time. An example of a temporary visible trigger object is a highway sign that is viewable only temporarily through the window of a car that is being driven at a high speed until the car passes the highway sign.

In some embodiments, such as in a crowded location, there may be numerous objects that are viewable through the AR electronic device. For example, in the downtown area of a city, in a store full of merchandise on racks, in a place crowded with people, in a tourist attraction or another dense environment, there may be numerous objects or people, both stationary and moving, that are in the FOV of the user via their AR electronic device. Technically, all these objects may be potential trigger objects that can be selected by an advertiser to display their ad. However, in such settings, it would not generally be viable to show all available advertisements: that would simply overload the user and not be beneficial to any advertiser, as the user may not pay attention to any one of them. As such, the embodiments draw the user's attention only to some objects and make only certain selected objects available as potential trigger objects that can be used by an advertiser to display an ad. By limiting the number of trigger objects, the system, which may be an ad platform, may protect the user's attention by not overwhelming the user with numerous amounts of trigger objects, resulting in losing their attention altogether.

In some embodiments, the advertiser may select a trigger object and place a bid based on the selected trigger object. In other embodiments, the control circuitry 220 and/or 228 may list a plurality of trigger objects that can potentially be selected by an advertiser for placing a bid to advertise on the selected trigger object. In either case, which object from the numerous objects displayed in the FOV can be used as a trigger object may be identified by the control circuitry 220 and/or 228 so as to not make every object in the live FOV a trigger object and overwhelm the user with ads. Accordingly, the control circuitry 220 and/or 228 may utilize an artificial intelligence (AI) engine to execute an AI algorithm for analyzing the live image input and identifying trigger objects. The control circuitry 220 and/or 228 may also utilize the AI engine, especially in a dense environment with numerous objects, to execute the AI algorithm to determine which objects to identify as potential trigger objects.

The control circuitry 220 and/or 228 may also utilize an image recognition (IR) engine to execute an IR algorithm for analyzing the live image input and identify potential objects, among a plurality of objects, that may be used as trigger objects.

In some embodiments, the control circuitry 220 and/or 228 may select trigger objects based on their size, selecting only those that meet at least a predetermined size for potential trigger objects. In other embodiments, the control circuitry 220 and/or 228 may select trigger objects based on their relevance to the user, selecting only those that meet at least a relevance threshold for potential trigger objects.

The control circuitry 220 and/or 228 may also select trigger objects based on any preference listed in the user's profile. The control circuitry 220 and/or 228 may also utilize a machine learning (ML) engine to execute an ML algorithm to determine which objects the user has gazed at in the past. The control circuitry 220 and/or 228 may determine the category of such objects, such as cars, clothing, etc., and, if such objects are present in the live image/scene, then identify those objects as potential trigger objects since there is a higher probability that, based on the user's pattern of gazing, the user may gaze at such objects again.

Whether the advertiser selects the trigger object, or the AI, IR, ML or other techniques are used to list potential objects that can be used by the advertiser as trigger objects, once a selection of the trigger object is made and a bid is placed by an advertiser associated with the selected trigger object, at block 102, in some embodiments, the control circuitry 220 and/or 228 obtains attributes of the selected trigger objects. The control circuitry 220 and/or 228 may analyze the trigger objects to determine and obtain such attributes. In other embodiments, metadata associated with attributes of the trigger objects may be available and used by the control circuitry 220 and/or 228 to analyze and categorize the attributes.

Other methods may also be used by the control circuitry 220 and/or 228 to obtain attributes associated with the trigger objects. The other methods, in some embodiments, may include the control circuitry 220 and/or 228 using computer vision techniques to recognize trigger objects from various angles, including when they might be partially occluded by other artifacts in the environment. Yet other methods may include the control circuitry 220 and/or 228 determining locations of objects in the FOV by volumetric representations of space such as point clouds. These representations are produced by current technologies such as LIDAR.

As depicted at block 102, in some embodiments, the trigger objects selected by content providers, such as advertisers, for which content providers may place a bid may be numbered 1-4. In this example, these trigger objects are 1) sofa, 2) person 1, 3) person 2, and 4) lamp.

Figure 1B:
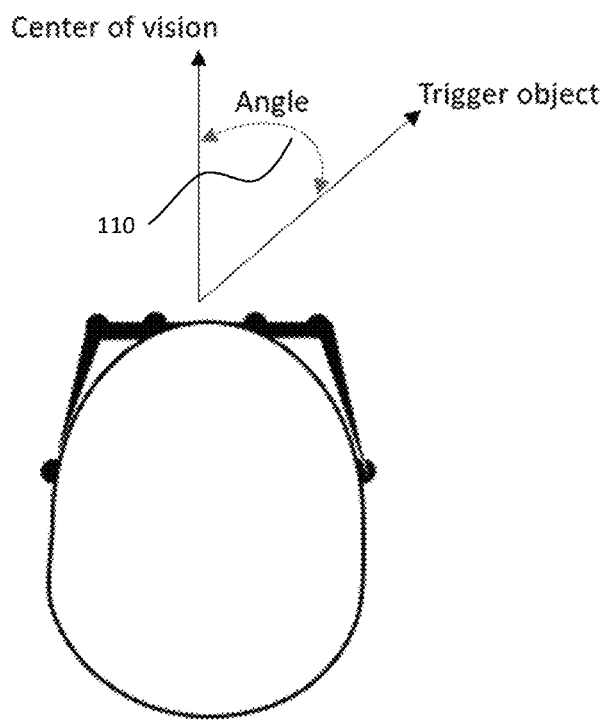
FIG. 1B is a block diagram that depicts an angle of view of the trigger object from the center of vision of an XR device, in accordance with some embodiments of the disclosure.

The attributes obtained by the control circuitry 220 and/or 228 for the sofa include, for instance, the angle in the FOV of the AR electronic device, which is a −15° angle, a distance of 60 ft., and the size being medium. The angle described may be measured based on the angular position of the trigger object from a straight line from the center of vision from the AR electronic device, such as angle 110 depicted in FIG. 1B.

In some embodiments, size may be listed as a category, such as extra small, small, medium, and large. In other embodiments, different types of scales may be used to identify the size of the trigger object. In yet other embodiments, exact or more precise dimensions of the trigger object as visible in the FOV may be calculated. In some embodiments, the control circuitry 220 and/or 228 may use an image recognition engine to analyze the dimensions of the trigger object as visible in the AR device's FOV. For example, control circuitry may use image recognition techniques to determine size of a trigger object as perceived from the AR device. As we know, when things are closer to you, they take up more of your FOV, so they seem bigger, however, when they are farther from you, they take up less of your FOV, and so seem smaller. Put another way, as the object gets closer, the visual angle increases, so the object appears larger, and as the object moves farther away, the visual angle decreases, making the object appear smaller. The relationship between object size and distance is an inverse linear relationship that may be calculated as the size of the object is 1/distance. The longer the distance, the smaller the size, analogous to the moon being very far away and as such seeming very small in size. The same principle is applied by the control circuitry to determine size based on distance of the trigger object from the focal point of the camera of the AR device from which the image is seen.

The attributes obtained by the control circuitry 220 and/or 228 for person 1 include the angle in the FOV of the AR electronic device, which is a 0° angle as person 1 is directly in front of the user; a distance of 50 ft.; and the size being large. Likewise, the attributes obtained by the control circuitry 220 and/or 228 for person 2 include the angle in the FOV of the AR electronic device, which is a +15 angle; a distance of 210 ft.; and the size being small.

The attributes obtained by the control circuitry 220 and/or 228 for the lamp include the angle in the FOV of the AR electronic device, which is a +63 angle; a distance of 230 ft.; and the size being extra small. Although some examples of attributes have been described in this embodiment, the embodiments are not so limited. Any other type of attribute, such as those attributes described in FIG. 10, or other attributes associated with the trigger object may also be obtained.

At block 103, the control circuitry 220 and/or 228 may determine if the trigger object is associated with restrictions. These restrictions may either prevent placement of an ad altogether on the trigger object or may require the ad to comply with rules and policies to be able to place the ad on the trigger object. Following the rules, the control circuitry 220 and/or 228, in some embodiments, may determine whether the ad is for a competing product on a trigger object that is associated with a different object. For example, if the trigger object is a Mercedes-Benz car and a competing product is a BMW car, then the rules may require the control circuitry 220 and/or 228 to determine whether BMW is considered as a competing product for the Mercedes-Benz car. If so, then the rules may prevent such an ad being placed on the Mercedes-Benz.

In some embodiments, the rules may prevent inappropriate ads from being superimposed on the trigger object. In such an embodiment, the control circuitry 220 and/or 228, applying the rule, may determine whether the ad is considered inappropriate. To make such a determination, the control circuitry 220 and/or 228 may access restrictions and policies associated with the trigger object and determine what the owner of the trigger object has listed as inappropriate. The control circuitry 220 and/or 228 may also invoke an AI engine to execute an AI algorithm to determine what is inappropriate for the object. The control circuitry 220 and/or 228 may also invoke an ML engine to execute an ML algorithm to determine what the owner of the trigger object has allowed in the past to determine what is appropriate. For example, an ad relating to an adult film on a trigger object that is in a mall visited by children may be deemed to be inappropriate. If a determination is made by the control circuitry 220 and/or 228 that the ad is inappropriate, then the control circuitry 220 and/or 228 may prevent placement of such an ad.

In some embodiments, the rules may prevent placement of the ad on the trigger object at certain times, such as times of day, week, month, etc. In such an embodiment, the control circuitry 220 and/or 228, applying the rule, may determine whether the ad is requested to be placed at the disallowed times. To make such a determination, the control circuitry 220 and/or 228 may access restrictions and policies associated with the trigger object and determine what the owner of the trigger object has listed as disallowed times. The control circuitry 220 and/or 228 may also invoke an AI engine to execute an AI algorithm to determine what is a disallowed time. The control circuitry 220 and/or 228 may also invoke an ML engine to execute an ML algorithm to determine what the owner of the trigger object has allowed in the past to determine what is disallowed time. For example, an ad on a trigger object that is for a dinner deal at a restaurant may be restricted to not be placed between 7 AM-10 AM in the morning. If a determination is made by the control circuitry 220 and/or 228 that the ad is about to be placed at the disallowed times, then the control circuitry 220 and/or 228 may prevent placement of such an ad. In another example, the owner of the trigger object may restrict another ad from being overlayed during rush hours or busy times, such that the trigger object may be reserved for the trigger object owner to promote their own products.

In some embodiments, the rules may prevent digital content items, such as ads, from being superimposed on the trigger object if the placement causes a safety concern. In such an embodiment, the control circuitry 220 and/or 228, applying the rule, may determine whether the surrounding areas of the trigger object are safe for placement of digital content items, such as ads. To make such a determination, the control circuitry 220 and/or 228 may analyze the live image input to determine if there are any obstacles or other safety concerns that would cause the user of the AR device to trip, fall, or get hurt if their attention is diverted to the digital content items, such as ads, and not focused on the path ahead. When the electronic device is a camera of a car, and the trigger objects are in the FOV of the car's camera, then the control circuitry 220 and/or 228 may analyze the live image input to determine the likelihood of an accident to occur or other safety concerns that would cause the driver of the automobile to get hurt or hurt others if their attention is diverted away from the road and towards the ad.

Although some examples of safety concerns have been described in this embodiment, the embodiments are not so limited. Any other type of safety concern, such as those described in FIG. 12, or other safety concerns are also contemplated.

Although block 103 is depicted after block 102 in FIG. 1A, the blocks are interchangeable. In some embodiments, restrictions on trigger objects may be analyzed first, and if the restrictions are satisfied by the bid related to the digital content item (such as an ad), only then may the attributes of the trigger object be obtained. In other embodiments, the attributes of the trigger object may be obtained, and then a determination may be made whether restrictions associated with the trigger objects are satisfied.

At block 104, a prominence score, a vantage score, and an adjusted prominence score are calculated for one or more trigger objects. In some embodiments, where two or more digital content items, such as ads, (on two separate trigger objects) compete for the user's attention, the less prominent one can win if it has a sufficiently higher bid, but the more prominent one can win otherwise (even if it has a smaller bid). The sufficiently higher bid (that is, the factor by which it must be higher) depends on the relative prominence of the objects for the competing ads and the relative sizes of those objects from an FOV of the user. Accordingly, an adjusted prominence score is calculated for each digital content item, such as an ad, proposed and its associated trigger object to determine a winning trigger object and a winning bid for the digital content item (e.g., ad).

To obtain the adjusted prominence score, the control circuitry 220 and/or 228 may calculate both the prominence score and the vantage score. As such, in one embodiment, the control circuitry 220 and/or 228 may calculate a prominence score for each object in the user's FOV that is proportional to the object's subtended angle and inversely proportional to its distance and viewing angle, such as the distance and angle described in block 102. This relates to the following equation for prominence:

$$P = \frac{S}{(V*D)}$$

In this equation, P represents the prominence score, S represents the subtended angle, V represents the viewing angle, and D represents the distance.

As referred to herein, the prominence score is a measure of how visible or "prominent" an object is in the user's FOV, such as from the AR electronic device or from the camera of a car. The farther objects and those in the periphery of the user's FOV, i.e., not directly in the line of sight (LOS), are less prominent than some others. If a user turns to look at a trigger object, the object gains prominence for that user. An object in the shadows would be less prominent until it is lit up, in which case it could be more prominent than some others.

The subtended angle(S) is the angle subtended by the trigger object at its widest. The subtended angle is based on the (magnitude of the angle of the) widest of the visible part of the trigger object from the center of the user's vision. An object that is partially blocked by another object may have a smaller subtended angle than one that is visible in its entirety. The subtended angle also depends on the perspective of the user toward the object. For example, a soda can viewed from the top would have a smaller subtended angle than the same can viewed from the side (at the same distance).

The viewing angle (V) is based on the (magnitude of the angle of the) midpoint of the visible part of the trigger object from the center of the user's vision with all numbers below 20 being set to 1 (that is, the smallest value is 1).

In one embodiment, the distance (D) is equal to the distance of the nearest point of the visible part of the trigger object from the user. For example, if the trigger object is a sofa and the sofa's left front corner is the closest to the user, then that is used as the nearest point. In another embodiment, D may be the distance to a midpoint or an end point. Using the same example of the sofa, if the trigger object is the sofa and the sofa's right front corner is the farthest from the user, then the right front corner may be used as the distance. Likewise, if the sofa has a mid-section, distance may be measure to the mid-section. In yet another embodiment, D may be the distance to a focal point, such as the point in a sofa that is a point of focus from the AR electronic device. In yet another embodiment, D may be the distance to a key feature on a trigger object. For example, a face of the person may be predetermined as a key feature, or a front grille of the car may be predetermined as a key feature. The control circuitry 220 and/or 228 may calculate a vantage score for each object in the user's FOV to level a playing field with respect to size of the object. Since the winning bid price is inversely related to the prominence of the trigger object, it is possible that digital content providers, such as ad agencies, may benefit merely by selecting larger trigger objects, since a larger object is likelier to appear more prominent in a user's FOV than a smaller object. As such, a vantage score (as a factor against size; "vantage" refers to "advantage in a competition") is considered to place the trigger objects on an equal playing field regardless of their size. In other words, the control circuitry calculates the vantage score such that solely the size of the trigger object does not affect the prominence of that object.

In some embodiments, the control circuitry 220 and/or 228 may be configured to compute a vantage score (H) for each trigger object in the user's FOV. To do so, the control circuitry 220 and/or 228 may set the vantage score of the object as the square root of the apparent area of the object in the user's FOV. The control circuitry 220 and/or 228 may calculate the square root to scale down the area and to get linear units. Accordingly, the control circuitry 220 and/or 228 may apply the following resulting equation to calculate the vantage score:

$$H = \sqrt{\frac{\text{Apparent}}{\text{Object Area}}}$$

In this equation, H represents the vantage score, and the apparent area of the object is the area of the trigger object as apparent from the FOV. The control circuitry 220 and/or 228 may determine the apparent area, for example, by using computer vision techniques to recognize trigger objects from various angles and then compute the portion of the trigger object's area that is visible from the user's position.

In some embodiments, once the prominence score P and vantage score V are calculated, the control circuitry 220 and/or 228 calculates the adjusted prominence score by applying the following equation:

$$AP = \frac{P}{H}$$

In this equation, AP represents adjusted prominence score, P represents prominence score, and H represents vantage score. As referred to herein, adjusted prominence is the prominence of a trigger object scaled down by the vantage score. The control circuitry 220 and/or 228, in some embodiments, performs the adjusted prominence score calculation to provide a fairer measure than prominence alone because it takes out what can be extraneous factors, such as size or obstructed visibility of the trigger object.

Block 105 shows examples of adjusted prominence scores for the trigger objects 1-4 selected by content providers, such as advertisers, to place digital content items on trigger objects, such as ads. As depicted, the adjusted prominence score of the sofa is 17.36, person 1 is 18.12, person 2 is 27.38 (the highest among the four trigger objects), and the lamp is 18.44 (the second-highest adjusted prominence score of the four trigger objects). Block 105 also depicts the bids made by each content provider, such as an advertiser, for their digital content item, such as an ad, that is to be placed on the selected trigger object. The bid price for the sofa is $15, person 1 is $12, person 2 is $46 (the highest among the four trigger objects), and the lamp at $23 is the second highest bid price. The bid increment is $0.55, the use of which will be described later in more detail.

As referred to herein, the bid price, also referred to as an offer or bid, is the price that the digital content provider, such as the ad agency or advertiser, is willing to pay for placing their digital content item, such as an ad, on the selected trigger object. Although the bid price provided by the digital content provider, such as the ad agency or advertiser, includes an upper boundary of the price, the price that the digital content provider, such as the ad agency or advertiser ultimately pays for placing the digital content item, such as an ad, may be lower than the upper boundary of the bid price.

At block 106, the control circuitry 220 and/or 228 determines the winning trigger object based on the calculations made at blocks 104 and 105. Further details relating to calculations of notional bids performed for each trigger object and selection of a trigger object as the winning trigger object based on the highest notional bid are described at 2055 in FIG. 20. The control circuitry, in one embodiment, selects the winning trigger object based on the highest notional bid computed as its offer multiplied by its adjusted prominence score, i.e., its prominence score divided by its vantage score (P/H). This notional bid would be calculated for all the trigger objects. For example, for trigger object 4 the calculation would be $23×18.44=424.12. For trigger object 3, the calculation would result in $46×27.38=1259.48 as the notional bid. The control circuitry 220 and/or 228 would then select the winning trigger object based on the highest notional bid, which is 1259.48, i.e., the winning trigger object is person 2, on whom a digital content item, such as an ad, may be overlayed or superimposed.

At block 107, the control circuitry 220 and/or 228 determines the winning bid price, based on the calculations made at blocks 104 and 105. The control circuitry, in one embodiment, applies the following formula to determine the winning bid price:

$$\left[\frac{2^{nd} \text{ highest bid} \times AP}{\text{Winner } AP}\right] + \text{Bid increment}$$

In some embodiments, calculating the winning bid price by using the above formula allows the control circuitry 220 and/or 228 to determine a winning price that is a fair market value to the bid provider based on other bids received. In other words, the second-highest bid is used to determine, in part, what the market is willing to offer for the trigger object. The market value is taking into account to determine the winning bid price by ensuring that the winning bid price is within reason of what the market is willing to offer for the trigger object and not a far departure.

Applying this equation to the example used in this embodiment would result in using the second-highest bid price, which is $23 for the lamp, and multiplying it by its adjusted prominence (18.44). The result of the multiplication may then be divided by the winning adjusted prominence score, which is the adjusted prominence score of trigger object 3 that won as the winning trigger, i.e., the adjusted prominence (AP) of trigger object 3=27.38. The result of this equation is 16.04 as the winning bid price. This can be depicted as follows:

$$\left[\frac{23 \times 18.44}{27.38}\right] + 0.55 = 16.04$$

As such, the trigger object that won is trigger object 3 (person 2), and the price that the digital content provider, such as an advertiser or ad agency, has to pay for placing a content item (e.g., ad) on trigger object 3 is $16.04, which is much less that their highest bid price of $46.

Figure 13:
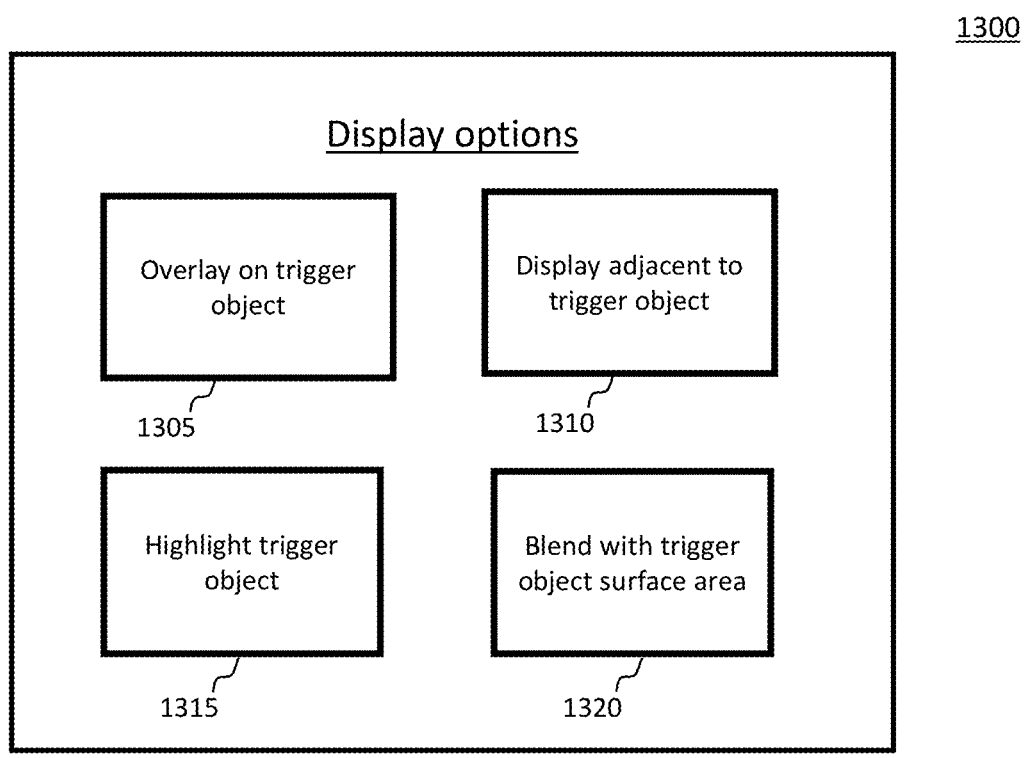
FIG. 13 is a block diagram of display options that may be used to display a content item on a trigger object, in accordance with some embodiments of the disclosure.

At block 108, once the winning trigger object and winning bid price have been identified, the control circuitry 220 and/or 228 may obtain the content item, such as an ad, from the winning content provider, such as an advertiser or ad agency, and place the ad on person 2. Some examples of display options used by the control circuitry 220 and/or 228 to display the ad are depicted in FIG. 13. As depicted in block 108, the ad displayed is that of a jacket by DKNY™ that is for sale at 30% off.

The embodiments described above in blocks 101-108 provide a way to select advertisements (winners in an auction) by taking into account the amount bid as well as the viewing angle, distance, and size of the trigger object. The embodiments enable advertisers to place bids on trigger objects that may appear in arbitrary positions in the user's FOV. The amount paid by the digital content provider, such as an ad agency or advertiser, reflects the cost of the user's attention in that (all else being equal) an ad on a trigger object that happens to be more front and center in the current FOV would be selected only if a larger amount had been offered for that object, and a larger price would be charged for it.

FIG. 2 is a block diagram of a system for determining a winning bid for a winning trigger object in an AR bidding environment, in accordance with some embodiments of the disclosure and FIG. 3 is a block diagram of a generalized electronic AR device for using in an AR bidding environment, in accordance with some embodiments of the disclosure.

FIGS. 2-3 also describe example devices, systems, servers, and related hardware that may be used to implement processes, functions, and functionalities described at least in relation to FIGS. 1A and 5-20. Further, FIGS. 2-3 may also be used for receiving live real-world images and video, live imagery via a camera input, live imagery in real-time, determining objects in the live real-world input, including trigger objects, selecting a subset of all objects in the live image as potential trigger objects, obtaining bids from advertisers, ad agencies, ad platforms, where the bids include price the advertisers, ad agencies, ad platforms are willing to pay to place an ad on the trigger object, the bid price being the upper limit of what they are willing to pay, obtaining attributes associated with potential trigger objects, the attribute data including distance, angle, subtended angle, size of the trigger object, performing calculations which include prominence score, vantage score, and adjusted prominence score, perform further calculations for determining a winning trigger object and a winning bid price, determining safety risks associated with displaying an ad on the trigger object, determining any ad placement restrictions, determining a format for displaying the ad on the winning trigger object, overlaying the ad or blending the ad with the trigger object, invoicing the advertisers, ad agencies, and/or ad platforms based on the winning bid price, performing remedial actions when safety and restrictions are not met, and performing functions related to all other processes and features described herein.

In some embodiments, one or more parts of, or the entirety of system 200, may be configured as a system implementing various features, processes, functionalities and components of FIGS. 1A and 5-20. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3 or AR device of FIG. 4.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., offers and bids, trigger objects, attributes of trigger objects, prominence scores, vantage scores, adjusted prominence scores, bid increments, calculations made in excel sheets of FIGS. 15, 16 and 18, distances, angles, sizes, sightings related to trigger objects, ads, and AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to offers and bids, trigger objects, attributes of trigger objects, prominence scores, vantage scores, adjusted prominence scores, bid increments, calculations made in excel sheets of FIGS. 15, 16 and 18, distances, angles, sizes, sightings related to trigger objects, ads, and AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to obtaining a live image and multiple competing bids for placing ads on trigger objects in the live image, the control circuitry 228 may calculate prominence scores, vantage scores, and adjusted prominence scores to determine winning trigger object and winning bid price. It may also perform steps of processes described in FIGS. 1A, 5, and 20.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as bids, selection of trigger objects, ads, invoices, and input from AR devices such as sensor data. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augmented, or mixed reality device, or a device that can perform function in the metaverse, or any other device, computing equipment, or wireless device, and/or combination of the same capable of suitably displaying primary content and secondary content.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core I9 processor). In some embodiments, control circuitry 220 and/or control circuitry 218 are configured for receiving live real-world images and video, live imagery via a camera input, live imagery in real-time, determining objects in the live real-world input, including trigger objects, selecting a subset of all objects in the live image as potential trigger objects, obtaining bids from advertisers, ad agencies, ad platforms, where the bids include price the advertisers, ad agencies, ad platforms are willing to pay to place an ad on the trigger object, the bid price being the upper limit of what they are willing to pay, obtaining attributes associated with potential trigger objects, the attribute data including distance, angle, subtended angle, size of the trigger object, performing calculations which include prominence score, vantage score, and adjusted prominence score, using the results of the calculations to perform calculations for determining a winning trigger object and a winning bid price, determining safety risks associated with displaying an ad on the trigger object, determining any ad placement restrictions, determining a format for displaying the ad on the winning trigger object, overlaying the ad or blending the ad with the trigger object, invoicing the advertisers, ad agencies, and/or ad platforms based on the winning bid price, performing remedial actions when safety and restrictions are not met, and performing functions related to all other processes and features described herein, including those described and shown in connection with FIGS. 1A, and 5-20.

Computing device 218 receives a user input 204 at input circuitry 216. For example, computing device 218 may receive a user input like motions performed by the user while wearing an AR headset, including walking, running, or driving a car or what trigger objects can be seen by the user via a camera input of their AR device.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1A, 5, and 20.

FIG. 3 is a block diagram of a generalized electronic AR device for using in an AR bidding environment, in accordance with some embodiments of the disclosure. In an embodiment, the equipment device or AR device 300, is the same equipment device 202 of FIG. 2. The equipment device 300 may receive content and data via input/output (I/O) path 302. The I/O path 302 may provide audio content (e.g., such as in the speakers of an AR headset). The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 304 may include communications circuitry suitable for allowing communications between two separate user devices to perform the functions of receiving live real-world images and video, live imagery via a camera input, live imagery in real-time, determining objects in the live real-world input, including trigger objects, selecting a subset of all objects in the live image as potential trigger objects, obtaining bids from advertisers, ad agencies, ad platforms, where the bids include price the advertisers, ad agencies, ad platforms are willing to pay to place an ad on the trigger object, the bid price being the upper limit of what they are willing to pay, obtaining attributes associated with potential trigger objects, the attribute data including distance, angle, subtended angle, size of the trigger object, performing calculations which include prominence score, vantage score, and adjusted prominence score, using the results of the calculations to perform calculations for determining a winning trigger object and a winning bid price, determining safety risks associated with displaying an ad on the trigger object, determining any ad placement restrictions, determining a format for displaying the ad on the winning trigger object, overlaying the ad or blending the ad with the trigger object, invoicing the advertisers, ad agencies, and/or ad platforms based on the winning bid price, performing remedial actions when safety and restrictions are not met, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store various types of content (e.g., offers and bids, trigger objects, attributes of trigger objects, prominence scores, vantage scores, adjusted prominence scores, bid increments, calculations made in excel sheets of FIGS. 15, 16 and 18, distances, angles, sizes, sightings related to trigger objects, ads, and AI and ML algorithms). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application.

FIG. 4 is a block diagram of a generalized AR headset device for using in an AR bidding environment, in accordance with some embodiments of the disclosure.

In some embodiments, the extended reality devices, which include augmented reality devices such as headsets, glasses, mobile phones, or other wearable devices, may be used to perform the processes described herein. The extended reality devices may be non-immersive, fully immersive, semi-immersive or have some other combination of virtual, augmented, or mixed reality. For example, the extended reality device may be an Oculus Rift™, Valve™, Sandbox VR™, or a Sony PlayStation VR™. It may also be smart/virtual glasses such as Iristick Z1™, Epson Moverio BT-200™, or Sony SmartEyeglass™. The non-immersive experiences may allow the user to experience a live input feed through a computer without the user directly interacting with the virtual environment. A fully immersive experience may provide a realistic experience within the virtual world where the user interacts with the virtual environment based on their movements.

In some embodiments, the AR device may include a complete system with a processor and components needed to provide the full extended reality experience. In other embodiments, the AR device may rely on external devices to perform all the processing, e.g., devices such as smartphones, computers, and servers. For example, the headset may be a plastic, metal, or cardboard holding case that allows viewing, and it may be connected via a wire or wirelessly or via an API to a smartphone and use its screen as lenses for viewing.

As depicted in FIG. 4, in one embodiment, the AR headset used includes six degrees of freedom (6DOF). Since the headset works by immersing the user into a virtual environment that has all directions, for a full immersive experience where the user's entire vision, including the peripheral vision, is utilized, an AR headset that provides the full 6DOF is preferred (although a AR headset with 3DOF can also be used).

Having the 6DOF allows the user to move in all directions and also experience trigger objects and the environment in the augmented world from all directions. These 6DOF correspond to rotational movement around the x, y, and z axes, commonly termed pitch, yaw, and roll, as well as translational movement along those axes, which is like moving laterally along any one direction x, y, or z. Tracking all 6DOF allows the system to capture the user movements, as well as their field of view, in both translational as well as rotational directions, thereby providing a full 360 view in all directions.

Although some references have been made to the type of AR headset, the embodiments are not so limited, and any other AR headset available in the market may also be used with the embodiments described herein.

Figure 5:
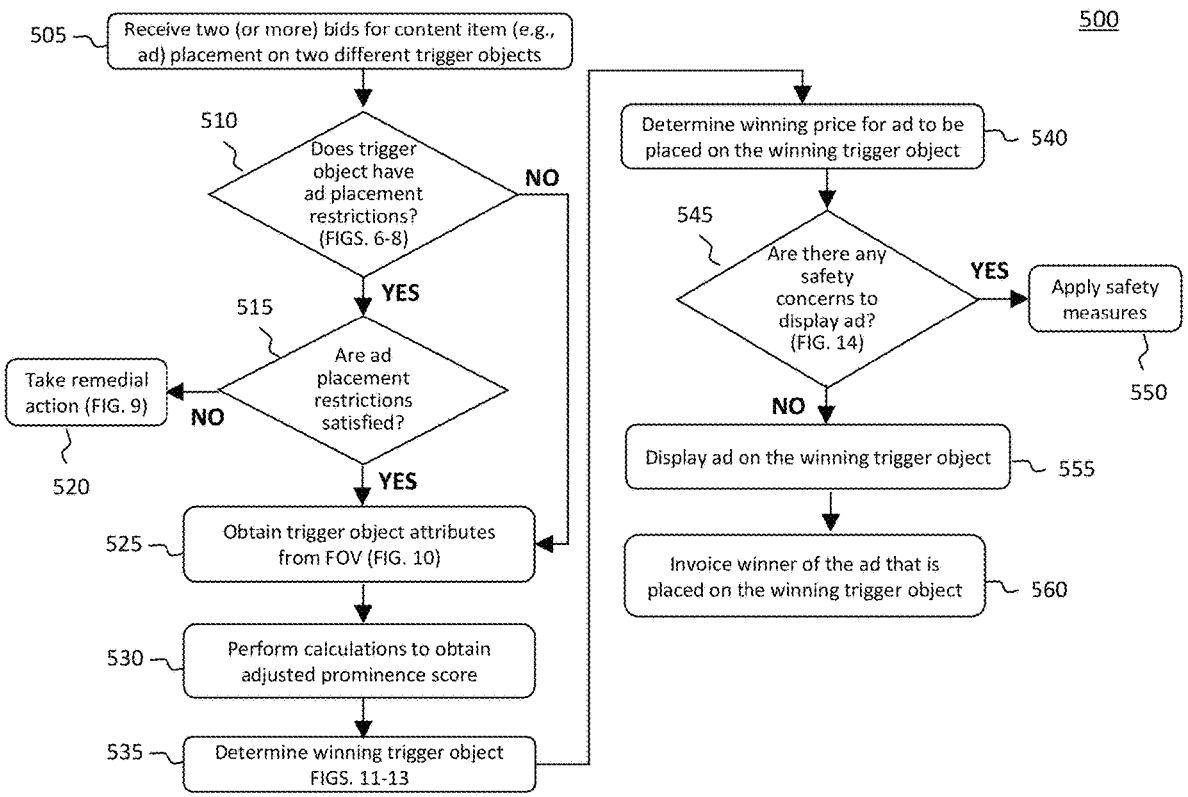
FIG. 5 is a flowchart of a process for determining a winning bid for a winning trigger object in an AR bidding environment, in accordance with some embodiments of the disclosure.

FIG. 5 is a flowchart of a process for determining a winning bid for a winning trigger object in an AR bidding environment, in accordance with some embodiments of the disclosure. The process 500 may be implemented, in whole or in part, by systems or devices such as those shown in FIGS. 2-3. One or more actions of the process 500 may be incorporated into or combined with one or more actions of any other process or embodiments described herein. The process 500 may be saved to a memory or storage (e.g., any one of those depicted in FIGS. 2-3) as one or more instructions or routines that may be executed by a corresponding device or system to implement the process 500.

In some embodiments, an XR device, such as an AR device that may be an AR headset depicted in FIG. 4, may be used by a user to view their surroundings, which include a live image of the real world surrounding them. The AR electronic device includes a camera that is connected either directly or wirelessly to a display and has capability to have an input of the live image of a real world in real time. The live image is also referred to herein as the scene or live input. The amount and extent of the live image that can be viewed depends on the FOV of the camera input. For example, if the camera FOV has a span of 190°, then that is the amount of live image that can be viewed by the user of the AR device.

As described earlier, the AR electronic device may be a wearable device, such as smart glasses, with control circuitry 220 and/or 228, that allows the user to see through a transparent glass to view objects in its FOV. In another embodiment, the AR electronic device may be a mobile phone having a camera and a display to intake the live feed input and display it on a display screen of the mobile device. The AR electronic device may include a front-facing or inward-facing camera and an outward-facing camera. The front-facing or inward-facing camera may be directed at the user of the device while the outward-facing camera may capture the live images in its FOV.

Although an AR device will be used as an example in the embodiments, other types of devices that can receive a live input of the real world and allow overlaying of content items, including, in a non-limiting example, ads, in an XR environment, such as an AR environment, are also contemplated. For example, a camera associated with an autonomous car or an IoT device that includes a camera are also contemplated within the embodiments.

At block 505, the control circuitry of a system, such as control circuitry 220 and/or 228 of the system of FIG. 2, may receive two (or more) bids for content items to be placed on two different trigger objects.

At block 510, the control circuitry of a system, such as control circuitry 220 and/or 228 of the system of FIG. 2, may determine whether the trigger object has any content item placement restrictions associated with it. These restrictions may either prevent placement of the content item, such as an ad, altogether on the trigger object or may require the content item to comply with rules and policies for it to be allowed to be placed on the trigger object, such as overlayed or blended with the trigger object.

If a determination is made at block 510 by the control circuitry 220 and/or 228 that the trigger object does not have any content item placement restrictions, then the process may move to block 525.

If a determination is made at block 510 by the control circuitry 220 and/or 228 that the trigger object has ad placement restrictions, then the control circuitry 220 and/or 228, at block 515, may obtain the restrictions and determine whether the ad that is proposed in the bid to be placed on the trigger object satisfies the restrictions.

The restrictions for ad placement may include preventing a competing product from being display on a trigger object that competes with the product shown as the trigger object. For example, if the trigger object is Coca-Cola™ can, then an ad for Pepsi™, which competes with Coca-Cola, may be prevented. The restrictions for ad placement may also prevent inappropriate ads, such as ads that are not child-friendly or that are rated above PG13, from being displayed on the trigger object. The restrictions for ad placement may be time-based. In other words, they may prevent placement of the ad on the trigger object at certain times, such as times of day, week, month, etc.

The restrictions for ad placement may also prevent ads from being superimposed on the trigger object if the placement causes a safety concern. For example, if the ad diverts the attention of the user and has them not look at the path in front of them, or the road ahead, thereby putting them in danger of an accident or getting hurt, such ads and timing of their implementation may be prevented or adjusted, respectively. The control circuitry 220 and/or 228 may, in such circumstance, wait for the safety concern to be cleared before the ad can be placed, thereby delaying its placement. Additional safety concerns are described in relation to FIG. 12.

If a determination is made at block 515 by the control circuitry 220 and/or 228 that the ad placement restrictions have not been satisfied, then the control circuitry 220 and/or 228 may, at block 520, take remedial action. In some embodiments, this remedial action may involve the control circuitry informing the advertiser or ad agency that their ad does not satisfy the ad placement restrictions. The control circuitry 220 and/or 228 may also identify the policy or rule and provide it to the advertiser or ad agency such that the ad agency or advertiser may submit another ad that does satisfy the ad placement restrictions. Yet another remedial action taken by the control circuitry 220 and/or 228 may be to not place the ad, suggest other trigger objects whose restrictions the ad proposed may satisfy, or seek restriction changes from the trigger object owner. Further detail of remedial actions is provided in the description of FIG. 9.

If a determination is made at block 515 by the control circuitry 220 and/or 228 that the ad placement restrictions have been satisfied, then the control circuitry 220 and/or 228 may, at block 525, obtain trigger object attributes.

The control circuitry 220 and/or 228 may obtain attributes of the identified trigger objects based on invoking the AI or IR engines to analyze the object and determine its attributes. In other embodiments, metadata associated with attributes of the trigger object may be available and used by the control circuitry 220 and/or 228 to analyze and categorize the attributes.

Other methods may also be used by the control circuitry 220 and/or 228 to obtain attributes associated with the trigger objects. The other methods, in some embodiments, may include the control circuitry 220 and/or 228 using computer vision techniques to recognize trigger objects from various angles, including when they might be partially occluded by other artifacts in the environment. Yet other methods may include the control circuitry 220 and/or 228 determining locations of objects from the FOV by volumetric representations of space such as point clouds. These representations are produced by current technologies such as LIDAR.

Figure 10:
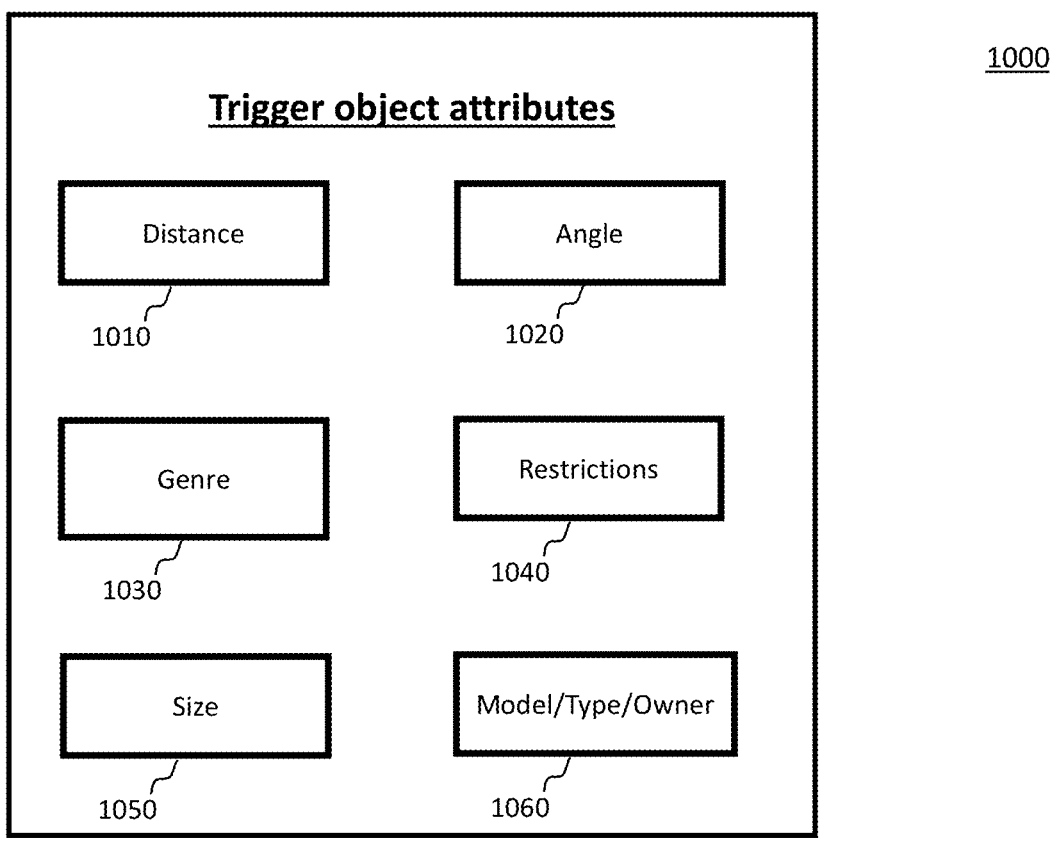
FIG. 10 is a block diagram of categories of trigger object attributes that may be obtained, in accordance with some embodiments of the disclosure.

Additional examples of the types of attributes associated with trigger objects that can be obtained are described further in relation to FIG. 10. Such attributes may include angle, distance, genre, restrictions, size, model, type, owner or other attributes that are associated with the trigger object. In some embodiments, these attributes may be used to perform calculations for determining which trigger object to select as the winning trigger object. Further details relating to calculations of notional bids performed for each trigger object and selection of a trigger object as the winning trigger object based on the highest notional bid are described at 2055 in FIG. 20. In other embodiments, the attributes may also be used in connection with the rules and policies to determine what types of ads can be placed on their trigger objects. For example, an attribute that identifies the trigger object's brand name can be used to ensure that a competing product with another brand is not placed on the trigger object if the rules don't allow such placement.

At block 530, the control circuitry 220 and/or 228 may perform various calculations to determine the adjusted prominence score of each trigger object. These calculations include calculating the prominence score and the vantage score for each trigger object and then using them to calculate the adjusted prominence score. As referred to herein, adjusted prominence is the prominence of a trigger object scaled down by the vantage score. This calculation is performed by the control circuitry 220 and/or 228 to provide a fairer measure than prominence alone because it takes out what can be extraneous factors, such as size of the trigger object.

At block 535, the control circuitry 220 and/or 228 determines the winning trigger object based on the calculations made at block 530. The control circuitry, in one embodiment, selects the winning trigger object based on the highest notional bid computed as its offer multiplied by its effective prominence, i.e., its prominence divided by its vantage score (P/H). The control circuitry 220 and/or 228 would then select the winning trigger object based on the highest score.

At block 540, the control circuitry 220 and/or 228 determines the winning price, or winning bid price, based on the calculations made at block 530. The control circuitry may apply the following formula to determine the winning bid price:

$$\left[\frac{2^{nd}\text{ highest bid} \times AP}{\text{Winner }AP}\right] + \text{Bid increment}$$

Figure 16:
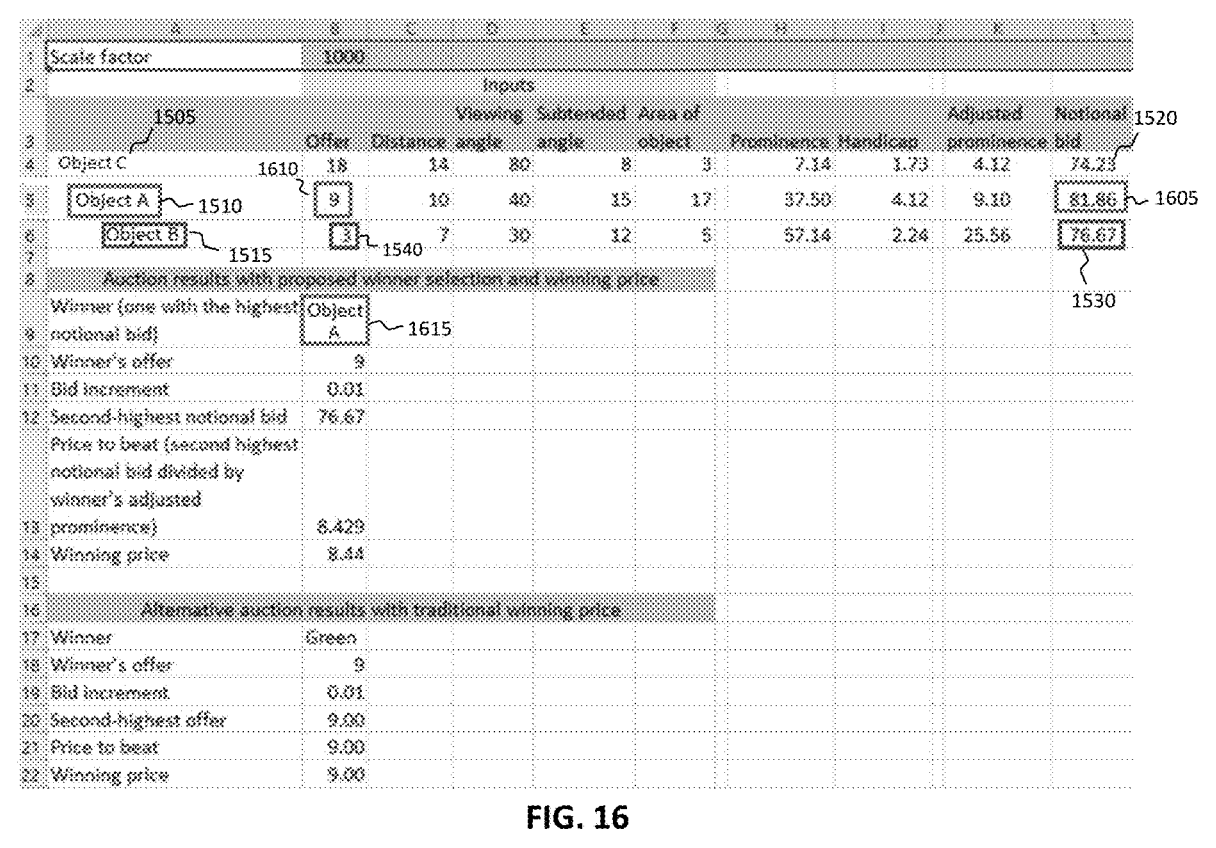
Figure 17:
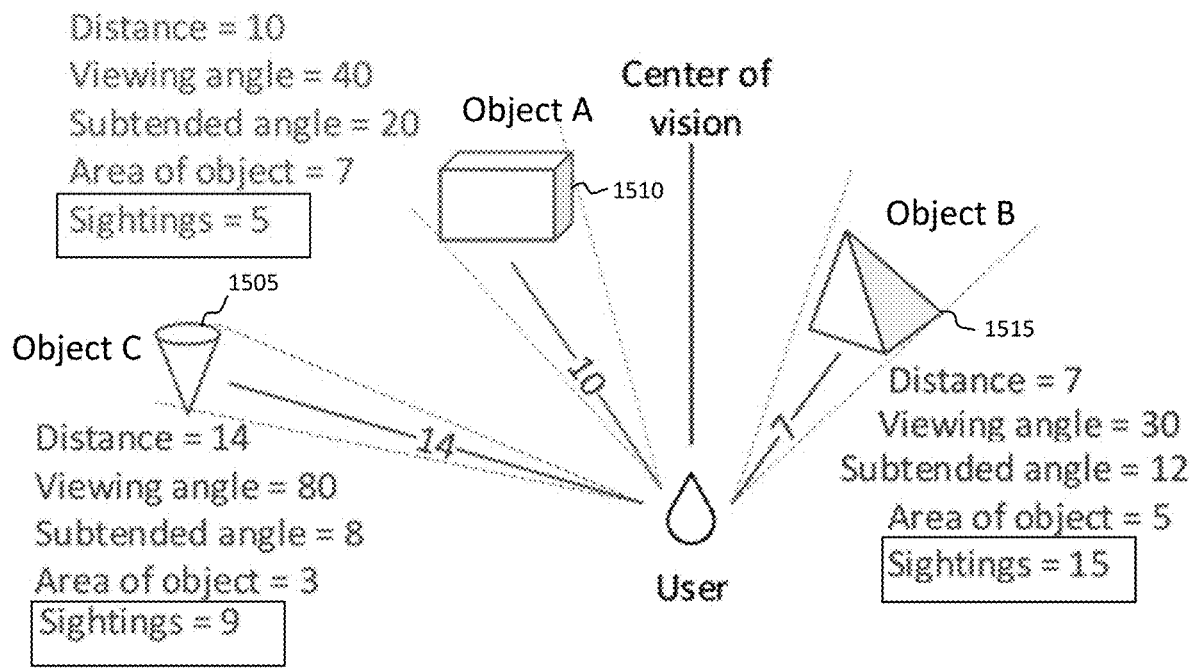
FIG. 17 is an example of trigger objects at varying distances and angles and having different number of sightings from the user's AR device, in accordance with some embodiments of the disclosure.

This formula uses the second-highest bid price multiplied by its adjusted prominence and the entire multiplied result divided by the winning adjusted prominence score of the winning trigger object. FIGS. 15-17 provide some examples of the calculations and selection of the winning bid price, which may be lower than the highest bid price that the advertiser or ad agency has submitted. However, if the adjusted prominence of another trigger object is higher, then the advertiser may have to increase their price to compete and ensure they can reserve the spot for ad placement.

At block 545, a determination is made by the control circuitry 220 and/or 228 whether there are any safety concerns in displaying the ad on the winning trigger object.

These safety concerns include, without limitation, any safety concern that could cause the user of the XR device, such as an AR device, to trip, fall, get hurt, or hurt others if their attention is diverted to the ad and not focused on the path ahead. This would also include a safety concern of the car getting into an accident if the user is driving the car and their attention is diverted to the ad.

If a determination is made at block 545 by the control circuitry 220 and/or 228 that there are safety concerns in displaying the ad on the winning trigger object and displaying the ad could cause harm to the user, their automobile, or other people, then at block 550 safety measures are applied. In some embodiments, these safety measures would include not displaying the ad until the safety concern is cleared. In another embodiment, the safety measure applied would be to alert the user either auditorily, or visually without the user having to turn their head from their current position, so as not to cause a distraction with the alert.

If a determination is made at block 545 by the control circuitry 220 and/or 228 that there are no safety concerns in displaying the ad, or that the safety concerns are minimal, then, at block 555, the control circuitry 220 and/or 228 may place the ad on the trigger object. Some examples of formats used for displaying the ad are described in relation to FIG. 13 below.

At block 560, the control circuitry 220 and/or 228 may automatically invoice the content provider, such as the ad agency or advertiser, with the winning bid price.

In some embodiments, there may be multiple trigger objects and multiple content providers wanting to place their content item overlayed on one of the trigger objects. For example, there may be a first and a second trigger object that are visible in the FOV of the XR device on which a content provider may overlay a content item. The processes described in FIGS. 1 and 5 may be used to determine which trigger object from the first and second trigger objects to select for controlling the XR device to overlay the content item.

In some embodiments, the control circuitry 220 and/or 228 may control the XR device to display a content item in an XR environment. The control circuitry 220 and/or 228 may identify a first trigger object and a second trigger object in the XR environment within a field of view of the XR device. The control circuitry 220 and/or 228 may then determine a first value associated with displaying a first digital content item overlayed on the first trigger object and a second value associated with displaying a second digital content item overlayed on the second trigger object.

The control circuitry 220 and/or 228 may also perform a plurality of calculation to determine prominence of both the first and the second trigger objects. In that regard, the control circuitry 220 and/or 228 may determine for the first trigger object, a first prominence score and a first vantage score and for the second trigger object, a second prominence score and a second vantage score. These calculations were also described earlier in relation to block 104 of FIG. 1.

The control circuitry 220 and/or 228 may calculate, based at least in part on the first prominence score and the first vantage score, a first adjusted prominence score for the first trigger object. Likewise, the control circuitry 220 and/or 228 may also calculate, based at least in part on the second prominence score and the second vantage score, a second adjusted prominence score for the second trigger object. The scores may be computed for the current location of the trigger object or the control circuitry may anticipate a future location of the trigger objects and compute their scores, For example, when a person is walking or driving in a car and moving towards a trigger object, the control circuitry may anticipate that the person/car, such as based on their velocity, may arrive at a location closer to the trigger object in X seconds. Accordingly, the control circuitry may use the future location to calculate the scores.

The control circuitry 220 and/or 228 may select between the first trigger object and the second trigger object for overlaying a content item provided by a content provider. For example, the control circuitry 220 and/or 228 may select the first trigger object. Such selection may be based at least in part on the first adjusted prominence score, the second adjusted prominence score, the first value, and the second value. The control circuitry 220 and/or 228, for example, may select the trigger object with the highest value of a bid price times the trigger object's adjusted prominence score. It may also select based on an aggregated score of first and second trigger object or some other comparison between their scores.

Once the winning trigger object, which in the above example, may be the first trigger object, is selected, the control circuitry 220 and/or 228 may determine whether the display of the first digital content item overlayed on the selected first trigger object would satisfy a digital content item placement criterion. If it does, then the control circuitry 220 and/or 228 may overlay a content item on the selected first trigger object in the XR environment. If it does not, then the control circuitry 220 and/or 228 may not overlay the content item or wait until the first trigger object would satisfy the digital content item placement criterion.

In some embodiments, once the first trigger object is selected, the control circuitry 220 and/or 228 may determine if there are any safety risks in overlaying the content item on the first trigger object. If there is a safety risk, then the control circuitry may implement a remedial action, which may include delaying the overlaying of the content item until the safety risk is cleared.

Figure 6:
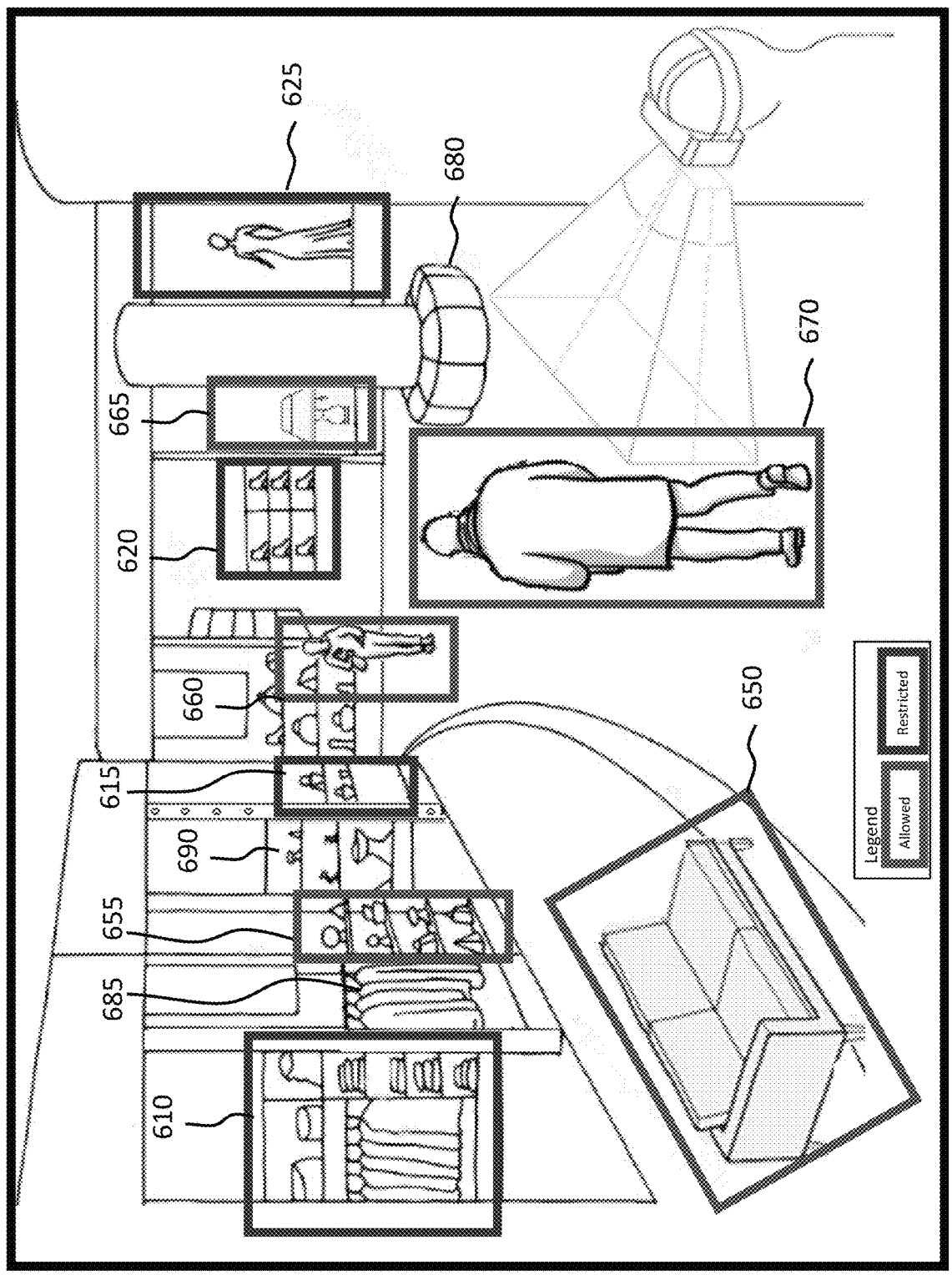
FIG. 6 is an example of a live scene with trigger objects that are restricted and unrestricted for content item placement, in accordance with some embodiments of the disclosure.

FIG. 6 is an example of a live scene with trigger objects that are restricted and unrestricted for ad placement, in accordance with some embodiments of the disclosure. In some embodiments, a live scene that includes a plurality of trigger objects may be marked with restricted and unrestricted (or allowed) trigger objects on which ads may be placed. Such markings, in some embodiments, may not be visible to the user of the XR device. Since the user of the XR device may simply be viewing the trigger objects and their overlayed content items, making the marking visible to the user may not be as useful. As such, the marking of restricted and unrestricted (or allowed) trigger objects may be presented to the providers of content items such that the providers may determine which trigger object to select or place their bid on for overlaying their content item, such as an ad. The restrictions may be associated with certain rules and policies that describe what type of content item, such as an ad, can and cannot be placed on the trigger object. As depicted in FIG. 6, 610-625 are trigger objects (in red boxes) that have certain content item, such as an ad, placement restrictions associated with them, and 650-670 are trigger objects (in blue boxes) that do not have any content item restrictions associated with them.

As depicted in FIG. 6, there are several other objects, such as objects 680-690, that have not been identified with restrictions. This may be because the control circuitry may not have made them available as trigger objects that can be used for ad placement. Since the environment is dense, i.e., as depicted in the picture of the mall, there are numerous objects that are for sale in the mall. Technically, all these objects may be potential trigger objects that can be selected by an advertiser to display their ad. However, to avoid overloading the user with too many ads thereby risking losing their attention, only certain objects may be selected as potential trigger objects for which an advertiser can select to place a bid and on which to then place an ad if the bid results in a win.

The control circuitry 220 and/or 228, in some embodiments, utilizes an image IR engine to execute an IR algorithm, an AI engine to execute an AI algorithm, and/or an ML engine to execute an ML algorithm and use its results to determine which objects to select as potential trigger objects for which an advertiser can place a bid. The control circuitry 220 and/or 228 may factor in size, user interest, relevance of the trigger object to user interest, previous gaze of user at related trigger objects and other factors to narrow down and select from when a dense environment is presented.

Figure 7:
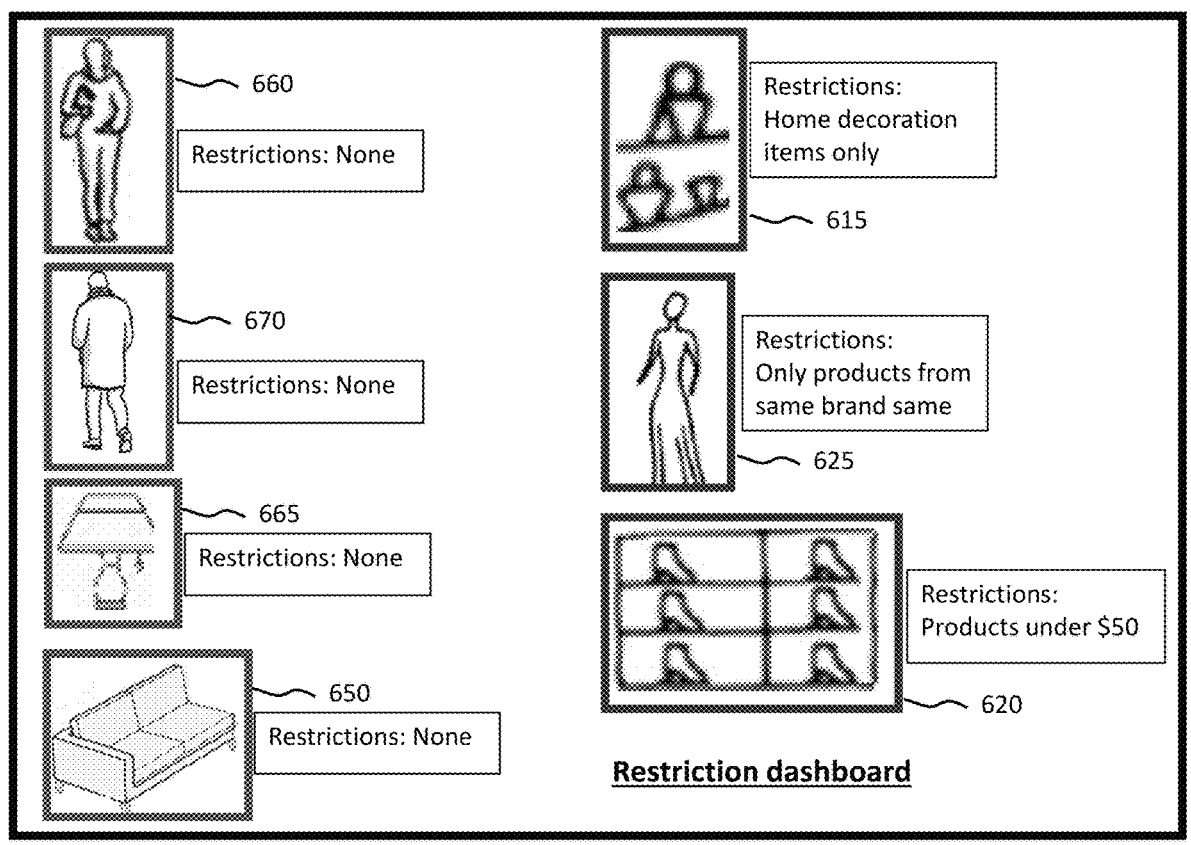
FIG. 7 is an example of a dashboard on a user interface that may be used by a content provider to determine trigger object restrictions, in accordance with some embodiments of the disclosure.

FIG. 7 is an example of a dashboard on a user interface that may be used by a content provider to determine trigger object restrictions, in accordance with some embodiments of the disclosure. In some embodiments, the advertiser may be able to view all the trigger objects that are offered by the system for selection by the advertiser to place a bid on. The user interface may display all the trigger objects and restrictions associated with each trigger object such that the advertiser can view them all in one glance. In some embodiments, when the number of trigger objects exceeds a screen of a user interface, the advertiser may be able to scroll through several screens of trigger objects and view their associated restrictions.

FIG. 8 is an example of restriction details associated with trigger objects, in accordance with some embodiments of the disclosure. As described previously, the restrictions may be of a wide variety. For example, they may prevent ads that are from competing products from being placed on the trigger objects or may only allow ads for a certain time period. The advertiser may pull up detailed descriptions as depicted in FIG. 8 for all trigger objects to determine their restrictions. The advertiser may also submit their ad and have the system match their ad with their trigger object whose restrictions the ad follows.

Figure 9:
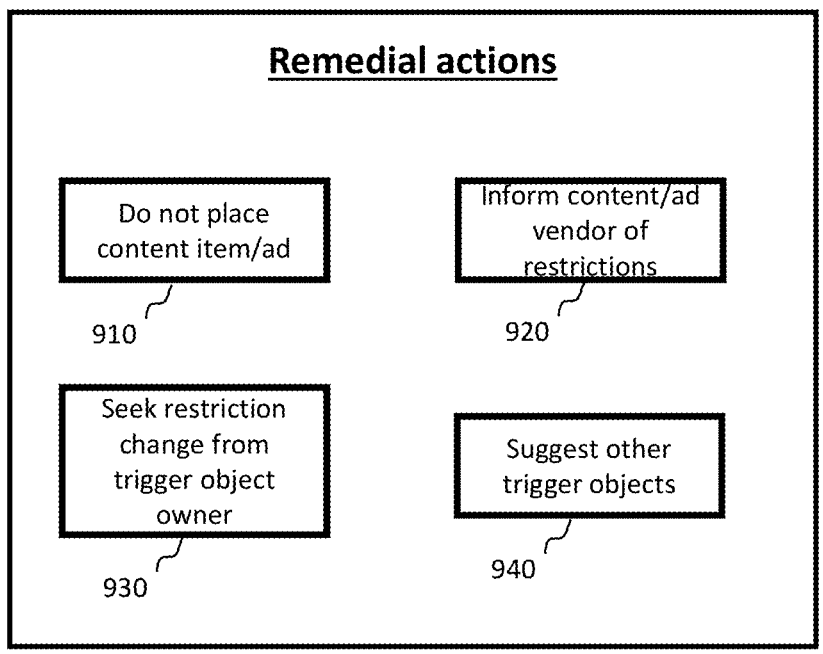
FIG. 9 is a block diagram of categories of remedial actions that may be taken when a content item does not satisfy the restrictions of the trigger object, in accordance with some embodiments of the disclosure.

FIG. 9 is a block diagram of categories of remedial actions that may be taken when a content item, such as an ad, does not satisfy the restrictions of the trigger object, in accordance with some embodiments of the disclosure. The remedial actions 910-940 may be implemented by the control circuitry 220 and/or 228 if a determination is made that the bid submitted, and the ad associated with the bid that is aimed at a trigger object does not comply with the ad placement restrictions of the trigger object.

When the ad does not comply with the ad placement restrictions of the trigger object, the control circuitry 220 and/or 228 may not place the ad, as depicted at block 910.

In other embodiments, as depicted at block 920, the control circuitry 220 and/or 228 may inform the ad vendor of the restrictions. The information may be presented on the ad vendor's or advertiser's user interface. The information may also be sent to the ad vendor via e-mail or other forms of communication. The information may include details of why the ad does not meet the restrictions and may also include a link to the rules and policies of the trigger object.

In some embodiments, as depicted at block 930, the control circuitry 220 and/or 228 may seek a restriction change from the trigger object owner. If the trigger object owner agrees to a restriction change to allow the ad proposed by the ad vendor or advertiser, then such restriction may be lifted from the trigger object. The trigger object may then be allowed as a potential trigger object that can be used for bidding by the advertiser to propose a bid price and an ad for placement on the trigger object.

Yet another remedial action taken by the control circuitry 220 and/or 228 may be, as depicted at block 940, to suggest to the ad vendor or advertiser other trigger objects, instead of the one selected, that can be used for ad placement. In this embodiment, the control circuitry may execute an algorithm that matches restrictions associated with trigger objects with the ad submitted by the ad vendor. Once a match between restrictions and ad content is determined, such trigger objects may be suggested to the vendor for bid placement.

FIG. 10 is a block diagram of categories of trigger object attributes that may be obtained, in accordance with some embodiments of the disclosure. In some embodiments, winners of ads that are to be placed on selected trigger projects are selected, at least in part, based on the amount of their bid as it correlates with attributes of the trigger object. As such, at least the minimum type of attributes of the trigger object are obtained. These attributes include distance 1010, viewing angle 1020, and size 1050 of the trigger object. Other attributes that may also be obtained and used in consideration of the winning bid include genre 1030 of the trigger objects, restrictions 1040 associated with the trigger objects, and details such as the type of product, the model of product, and the brand of product associated with the trigger object. In yet other embodiments, information about the owner of the trigger object may also be obtained.

In some embodiments, an attribute related to distance 1010 is obtained by the control circuitry 220 and/or 228 and used to determine how close or far the trigger object is from the FOV of the user. In some embodiments, trigger objects that are far may need to be boosted, i.e., offered a higher bid price, compared to trigger objects that are closer, and as such, the distance attribute is factored in, in part, to the overall computation of analyzing the price. In other embodiments, trigger objects that are closer may require the offering of a higher bid price. The distance (D) is equal to the distance of the nearest point of the visible part of the trigger object from the user's FOV. For example, if a trigger object is a wall or an automobile, the distance is the nearest point of the wall of the automobile that is visible to the user via their AR device.

In some embodiments, an attribute related to angle 1020 is obtained by the control circuitry 220 and/or 228 and used to determine whether the trigger object is directly in the center of the FOV of the user or in the periphery, and if the latter, at what angle. Trigger objects that are at a wider angle away from the central point in the user's FOV, i.e., in the user's peripheral vision, may needs to be boosted, i.e., offered a higher bid price, to compete with trigger objects that are directly in front of the user or nearer to the central point in the user's FOV. The attributes related to angles obtained are viewing angle and subtended angle.

The embodiments address the trigger object and associated bids in relation to their viewing angle. The viewing angle allows the control circuitry 220 and/or 228 to determine how much in the periphery of the user's FOV the trigger object lies. The viewing angle is based on the (magnitude of the angle of the) midpoint of the visible part of the trigger object from the center of the user's vision with all numbers below 20 being set to 1 (that is, the smallest value is 1). The subtended angle(S) is based on the (magnitude of the angle of the) widest of the visible part of the trigger object from the center of the user's vision. An object that is partially blocked by another object may have a smaller subtended angle than one that is visible in its entirety. The subtended angle also depends on the perspective of the user toward the object. For example, a soda can viewed from the top would have a smaller subtended angle than the same can viewed from the side (at the same distance). Since objects nearer the user, at a more central viewing angle, and subtending a larger angle at the user's eyes default to be better matches, such angles are obtained and factored in to the computation of the winning bid price.

Genre 1030 of the trigger object is an attribute that may also be obtained by the control circuitry 220 and/or 228. The genre may be used by the control circuitry 220 and/or 228 when the trigger object is associated with restrictions that, for example, specify that the ad needs to be in the same genre as the trigger object. For example, if the genre of the trigger object, i.e., the object current in the place, is an automobile, then, if the restriction associated with the trigger object requires an ad to be in the same genre, data that allows the control circuitry 220 and/or 228 to determine the genre of the ad would be important. Likewise, attributes relating to model/type/owner 1060 and other such related details may also be used when restrictions require compliance with any of those attributes.

In some embodiments, an attribute related to size 1050 of the trigger object is obtained by the control circuitry 220 and/or 228 and used to determine how big or small the trigger object is as it appears from the FOV of the user. As described above, determining a trigger object and winning bid based solely on the size of the trigger object selected by the advertiser makes it unfair to another advertiser who may be at a handicap or disadvantage by selecting a trigger object that is smaller in size. As such, to prevent size from becoming the ultimate deciding factor for awarding the winning bid, and to make the bidding field leveled for all, the control circuitry 220 and/or 228 calculate a vantage score for each object in the user's FOV (i.e. adjusts for the disadvantages by incorporating a handicap). This vantage score is related to the size of the trigger object. The vantage score is used in calculating the adjusted prominence score, which is the prominence of a trigger object scaled down by the vantage score. In other words, this calculation takes out size as being the extraneous factor to even the playing field for advertisers regardless of the size of the trigger object. As such, obtaining the size of the trigger object, an attribute of the trigger object, becomes important.

Figure 11:
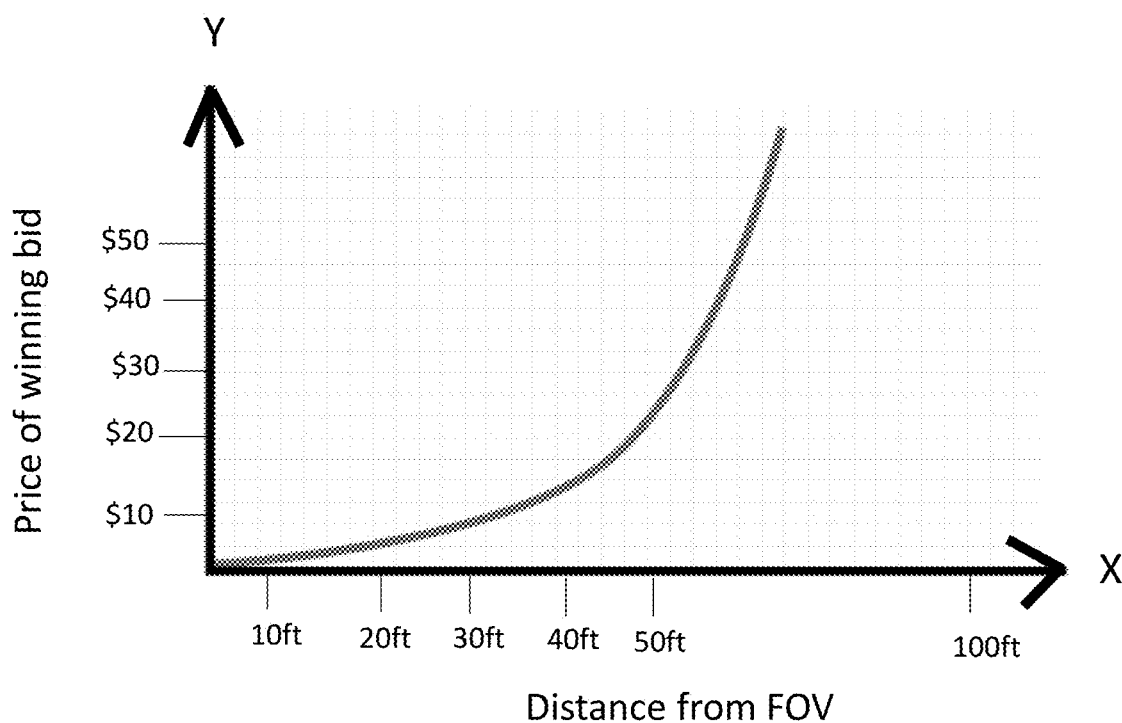
FIG. 11 is an example of a graph that explains a relationship between distance of the trigger object and price of the winning bid, in accordance with some embodiments of the disclosure.

FIG. 11 is an example of a graph that explains a relationship between distance of the trigger object and price of the winning bid, in accordance with some embodiments of the disclosure. In this embodiment, the x-axis represents the distance of the trigger object from the FOV of the user's augmented reality device and the y-axis represents the price of the winning bid. Although it is not a 1:1 relationship, this graph is simply provided to show the correlation between the price of the winning bid and the distance of the trigger object from the FOV of the user's augmented reality device. In other words, if the attribute of distance were considered in isolation from all the other attributes, which it is not, then the farther the trigger object from the FOV of the user's XR device the higher the bidding price would need to be to boost that far-away trigger object for it to compete with another trigger object that is closer as observed from the FOV of the user's augmented reality device.

Figure 12:
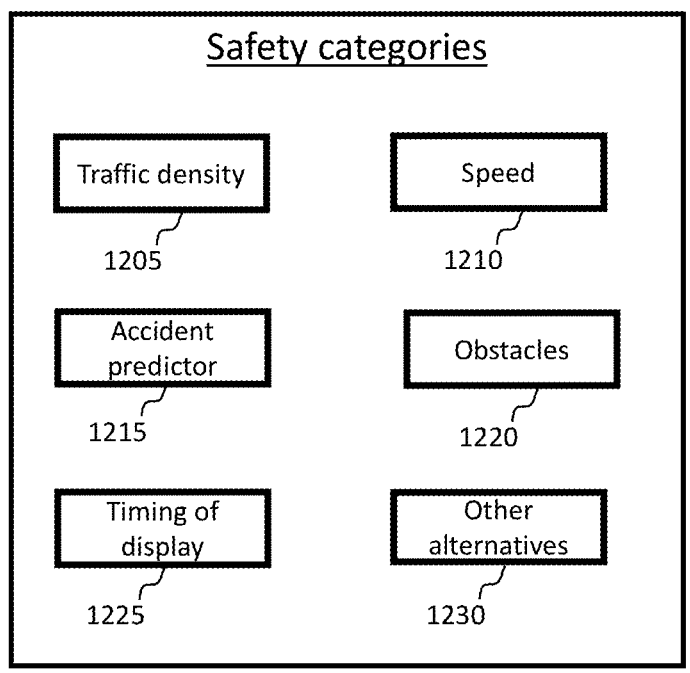
FIG. 12 is a block diagram of safety categories that are evaluated to determine if a user's safety is at risk due to placement of the content item, in accordance with some embodiments of the disclosure.

FIG. 12 is a block diagram of safety categories that are evaluated to determine if a user's (or other people's) safety is at risk due to placement of the content item, such as an ad, in accordance with some embodiments of the disclosure.

Displaying a content item (e.g., ad or any other type of content) on a display associated with the XR device, such as an AR device, may cause visual and cognitive distraction for the user. This safety risk posed by such display of an ad is further increased if the user is performing some activity while wearing the AR device, such as driving, biking, walking, running, or moving about in an environment that is crowded, that includes many obstacles, etc. The user may get distracted and fall, get hurt, get into an accident, or hurt others if the user's attention is diverted away from the path in front of them, or the road ahead. As such, the rules may prevent ads from being superimposed on the trigger object if the placement causes a safety concern. Some of the safety categories evaluated by the control circuitry include evaluating for traffic density 1205, speed 1210, accident predictor 1215, obstacles 1220, timing of display 1225, and other alternatives 1230.

In some embodiments, the control circuitry 220 and/or 228 may evaluate whether the user is performing an activity in an area of high traffic density 1205. In this embodiment, the user may be walking or running in an area that is highly crowded. The user may instead be driving a car that is in a high-traffic area. If the control circuitry determines that, based on the high-traffic area, there is a higher chance of the user running into someone, driving into an object or hitting another car, then the control circuitry may automatically prevent the ad from being displayed until the high-traffic area clears up.

In some embodiments, the control circuitry 220 and/or 228 may evaluate whether the user is driving at a high speed 1210. Data from transportation agencies suggest that increasing driving speed from 60 mph to 80 mph increases the risk of a fatal crash by four. The faster the speed of the car, the higher the chances that if the car gets into an accident, it will be worse or fatal than it would be at lower speeds. As such, if the control circuitry determines that the user is driving at a speed faster than a predetermined speed threshold, such as 70 MPH, then the control circuitry may automatically prevent the ad from being displayed until the car slows down, to lower the chances of an accident.

In some embodiments, the control circuitry 220 and/or 228 may evaluate, using an AI engine executing an AI algorithm, the likelihood of an accident to occur, such as by using an accident predictor tool 1215. If the control circuitry determines, based on the activity being performed by the user, that the likelihood of an accident is above a predetermined threshold, then the control circuitry may automatically prevent the ad from being displayed until the likelihood is lower than the threshold.

In some embodiments, the control circuitry 220 and/or 228 may use computer vision to determine if there are obstacles 1220 in the path of the user that may cause a fall. If so, the control circuitry may automatically prevent the ad from being displayed until the user passes the obstacles.

In some embodiments, the control circuitry 220 and/or 228 may evaluate the timing of the ad placement. For example, if the ad diverts the attention of the user and has them not look at the path in front of them, or the road ahead, thereby putting them in danger of an accident or getting hurt, implementation of such ads may be delayed until the safety risk is cleared.

In some embodiments, the control circuitry 220 and/or 228 may suggest alternatives 1230 when a safety risk is assessed. The alternatives may include placing an ad on a different trigger object that is more central to the user's focal point to avoid the user having to turn their head causing them to be distracted or to use a heads-up display in a car instead of the display sent by a navigation system to display the ad. The alternative may also include turning on audio, allowing the user to listen to the ad and glance at the images from time to time rather than having to look at them continuously.

FIG. 13 is a block diagram of display options that may be used to display an ad on a trigger object, in accordance with some embodiments of the disclosure. In some embodiments, once the winning trigger object and winning bid price have been identified, the control circuitry 220 and/or 228 may obtain the digital content item, such as an ad or some other type of digital content item, from the winning content provider, such as an advertiser or ad agency, and place the content item on the winning target object in the XR environment. The displaying of the content item, such as an ad, on the target object may use any of the display options, such as overlayed on the trigger object 1305, displaying the content item adjacent to the trigger object 1310, highlighting the trigger object 1315 and displaying the content item as overlay and adjacent to the trigger object, or blending the content item with the surface of the trigger object 1320. The displaying of the content item may also include providing equitable opportunities to content providers to insert their content item on, over, or otherwise in relation to trigger objects in the changing FOV. Such overlaying, blending, or determining another type of presenting of the content item may require the control circuitry to perform various computations and execute various processes using a processor. For example, the control circuitry may use an image recognition technique to identify the trigger object, a GPS locator or some other tracking mechanism to track the movement of the trigger object, including in relation to the movement of the XR device, and process such information to determine where to place the content item in the XR environment. For example, if the content item is to be overlayed on the trigger object, where the trigger object is a moving car and the XR device is in another moving car, the control circuitry would have to compute the relative locations of the XR device and the moving trigger object and routinely adjust the overlaying of the content item as the relative locations change. The control circuitry may also compute the velocities of both XR device and the moving trigger object on which the content item is to be placed and anticipate displacement of the moving trigger object based on its relative velocity to the XR device and determine future overlay corrections of the content item. For example, based on relative velocities, the control circuitry may determine that the moving trigger object would be at a location B (from its current location A) in three seconds. As such, the control circuitry may anticipate and calculate location and coordinates of the moving trigger object three seconds from now and determine the overlay placement of the content item such that it is aligned on the trigger object's (three seconds later) future position. Likewise, in block 108 of FIG. 1A, since the XR device is on the user and the user is moving at a certain pace, the control circuitry may anticipate future locations of the trigger object from the perspective of the XR device based on the user's pace and determine future overlay locations in the XR environment of the content item.

In some embodiments, the control circuitry 220 and/or 228 may overlay 1305 the ad on the winning trigger object. In such embodiments, the ad may cover a portion or the entirety of the trigger object.

In some embodiments, the control circuitry 220 and/or 228 may place the ad adjacent 1310 to the winning trigger object. In some embodiments, the control circuitry 220 and/or 228 may determine a suitable area adjacent to the winning trigger object that does not obstruct another trigger object and place the ad in the suitable area.

In some embodiments, the control circuitry 220 and/or 228 may highlight the trigger object to get the user's attention and then place the ad as an overlay, adjacent to, or as a pop-up on the trigger object.

In some embodiments, the control circuitry 220 and/or 228 may blend the ad with the trigger object's surface area such that the ad does not bleed outside the surface area of the trigger object. In these embodiments, the control circuitry 220 and/or 228 may utilize computer vision techniques to determine the surface area covered by the trigger object. The control circuitry may then blend the ad such that the outer boundary of the ad is within the determined surface area of the trigger object. In some instances, the control circuitry may resize the ad such that it fits within the surface area and boundaries of the trigger object.

Figure 14:
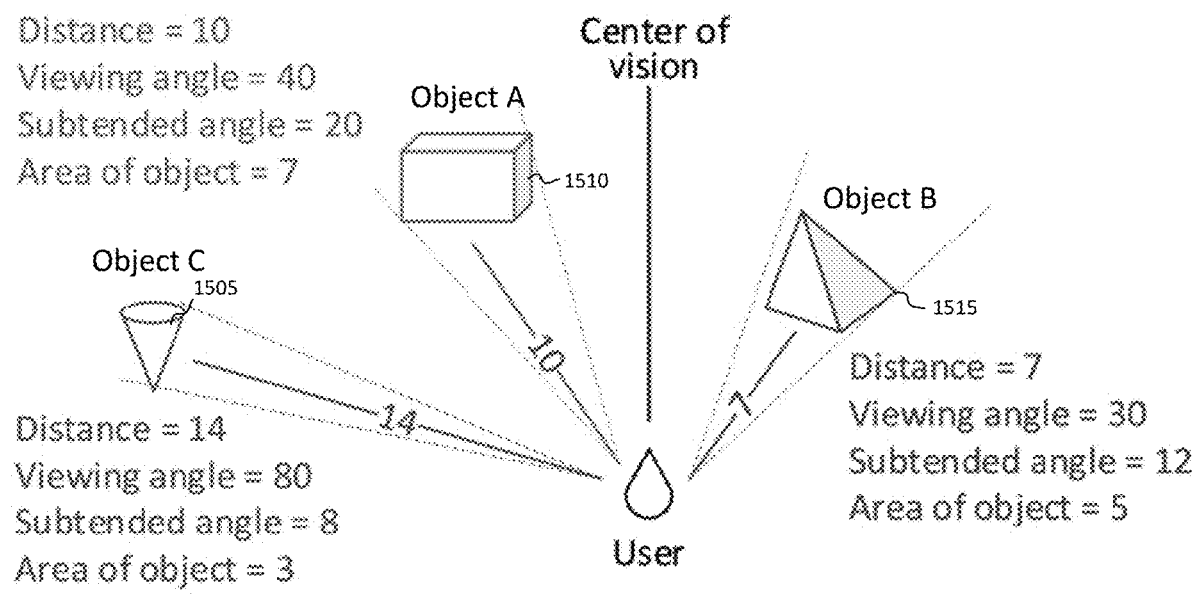
FIG. 14 is an example of trigger objects at varying distances and angles from the center of vision from the user's AR device, in accordance with some embodiments of the disclosure.

FIG. 14 is an example of trigger objects at varying distances and angles from the center of vision, in accordance with some embodiments of the disclosure. In this embodiment, three objects are depicted in the user's FOV. The objects are called Objects A, B, and C, and their relevant information is stated along with them. In some embodiments, this relevant information may be used by the control circuitry 220 and/or 228 to calculate the prominence, vantage, and adjusted prominence scores as described at blocks 104 of FIG. 1A and 530 of FIG. 5. The information may also be presented on a user interface and may be used by advertisers in determining which trigger object to select for bidding.

FIG. 15 is an example of a calculation performed to determine a winning trigger object and a winning bid price, in accordance with some embodiments of the disclosure. In this environment, the control circuitry calculates the prominence score, vantage score, and adjusted prominence score based on the angles and distance as depicted in FIG. 14. Based on the calculations, the adjusted prominence for trigger object A 1510 is 9.10, for trigger object C 1505 is 4.12, and trigger object B 1515 is 25.56, which is the highest of the adjusted prominence scores among the three objects. Based on the notional bid of object B as the highest, trigger object B may be selected as the winner, as referenced by reference number 1535. If the second-highest notional bid is 74.23 and the bid increment is 0.01, applying the formula for the winning bid price, which is $$\left[ \frac{2^{nd} \text{ highest bid} \times AP}{\text{Winner } AP} \right] + \text{Bid increment,}$$

the winning bid price is deemed to be 2.91.

In the depicted embodiment of FIG. 15, the offer or bid placed by the advertiser or ad agency for trigger object A is $8 (reference number 1545), object B is $3 (reference number 1540), and object C is $18 (reference number 1546). The notional bid calculated for object A is 8×9.1=72.76 (reference number 1525), for object B is 3×25.56–76.67 (reference number 1530), and object C is 18×4.12=74.23 (reference number 1520), with object B's notional bid resulting in the highest notional bid over objects A and C, thereby being selected as the winner. Additional details relating to calculations of notional bids performed for each trigger object and selection of a trigger object as the winning trigger object based on the highest notional bid are described in relation to 2055 in the description of FIG. 20.

FIG. 16 is an example in which a bid price is increased in order to be selected as the winning bid, in accordance with some embodiments of the disclosure.

In this embodiment, realizing that their bid has not won, the advertiser or ad agency for trigger object A may raise their bid price from $8 to $9, as depicted in reference number 1545 of FIG. 15 and 1610 of FIG. 16, respectively.

Based on the increased bid, the notional bid, which is calculated based on the equation Notional bid=Bid price× Adjusted prominence, the notional bid was raised from 72.76 in FIG. 15 to 81.86 in FIG. 16, as referenced by reference numbers 1525 and 1605, respectively.

Since the notional bid is now the highest bid after the bid price was raised to $9, the advertiser or ad agency for trigger object A is selected as the winner, as depicted by reference number 1615. Accordingly, advertisers or ad agencies may monitor their bids and increase them as needed to improve their chances of winning the trigger object on which their ad for a product or service can be placed.

Figure 18:
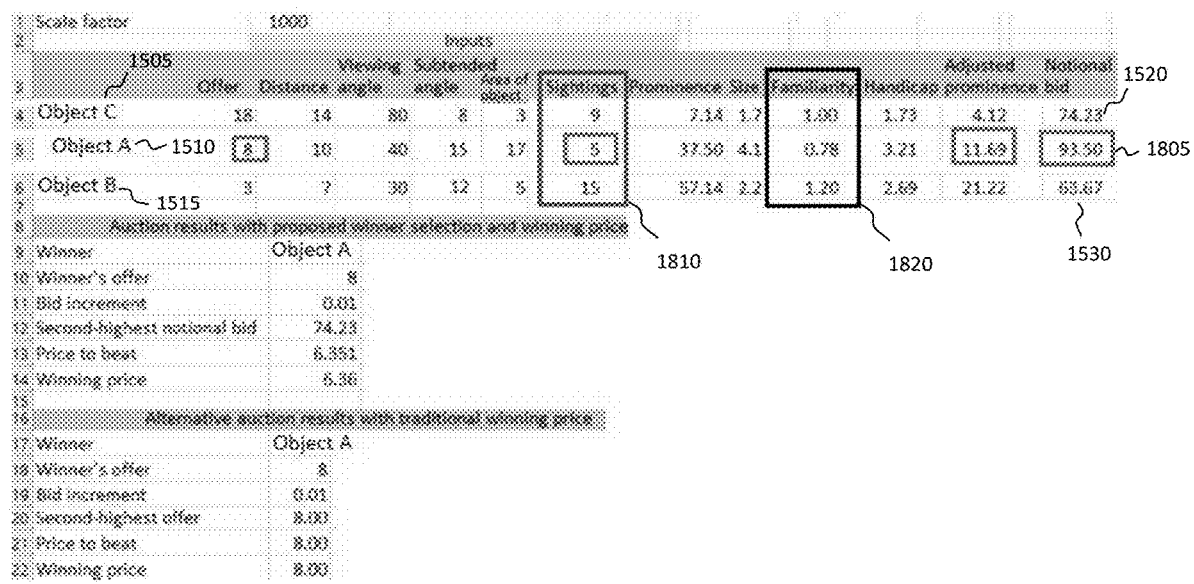
FIG. 18 is an example of a calculation performed based on the attributes from FIG. 17 to determine a winning trigger object and a winning bid price, in accordance with some embodiments of the disclosure.

FIG. 17 is an example of trigger objects being at varying distances and angles and having different numbers of sightings from the user's XR device, such as an AR device, in accordance with some embodiments of the disclosure. FIG. 18 is an example of a calculation performed based on the attributes from FIG. 17 to determine a winning trigger object and a winning bid price, in accordance with some embodiments of the disclosure.

In the embodiments of FIGS. 17-18, the winning trigger object may be determined based on the process of FIGS. 1A and 5. Once the winning trigger object is determined, such as via the embodiments of FIGS. 17-18, the winning price is calculated. This winning price is based on the notional bids submitted by the various parties. In FIG. 14, the notional bids, angles, distances, areas of trigger objects, and subtending angles are considered in determining the winning trigger object and price. FIG. 18 is similar to FIG. 15 but with sightings 1810 now calculated and taken into consideration. These calculations are further described in FIG. 18.

As depicted in FIGS. 17 and 18, object A 1510 had 5 sightings, object B 1515 had 15 sightings, and object C 1505 had 9 sightings. Sightings, as used herein, refer to the number of times a trigger object has been viewed via the XR device, such as an AR device, within a predetermined time window.

In some embodiments, the calculations made in FIG. 18 include a calculation of familiarity 1820. Familiarity, as referred to herein, is calculated as the logarithm of the sightings of a trigger object. It is a measure of how familiar the user is to the trigger object. The more sightings of the same trigger object, the higher the familiarity is of that trigger object to the user, since they have seen it multiple times.

In some embodiments, familiarity is incorporated into vantage score. Familiarity is incorporated into the vantage score by multiplying it into the vantage. That is, without familiarity, the vantage score is calculated as the square root of the area of the object (which we can name "size"). With familiarity, the vantage score is captured as the product of the size with the familiarity, in effect scaling up the vantage score by familiarity. The modified vantage score, i.e., a vantage score that incorporates familiarity, is used to determine the adjusted prominence. Sightings and familiarity applied to the trigger objects of FIG. 17 result in the spreadsheet provided in FIG. 18. Accordingly, it can be noted that object B 1515 has a larger number of sightings, i.e., 15 sightings, than the others and is therefore down weighted more. As such, by introducing familiarity, with the other details being the same as in FIG. 15 (in which object B was the winner), object A, with a lesser number of sightings, which is less down weighted as compared to objects B and C, is selected as the winner. In other words, when the sightings and familiarity go up, the calculations result in the notional bid being down weighted and scoring lower. Incorporating measuring familiarity as explained above would benefit advertisers whose target objects are less familiar to the user and thus help promote novelty. Accordingly, in some embodiments, advertisers whose objects are more familiar would have to bid higher than otherwise to stay competitive. In some embodiments, from the ad platform's perspective, showing users fewer ads for less-familiar objects may be a desirable feature and help in retaining users.

Figure 19:
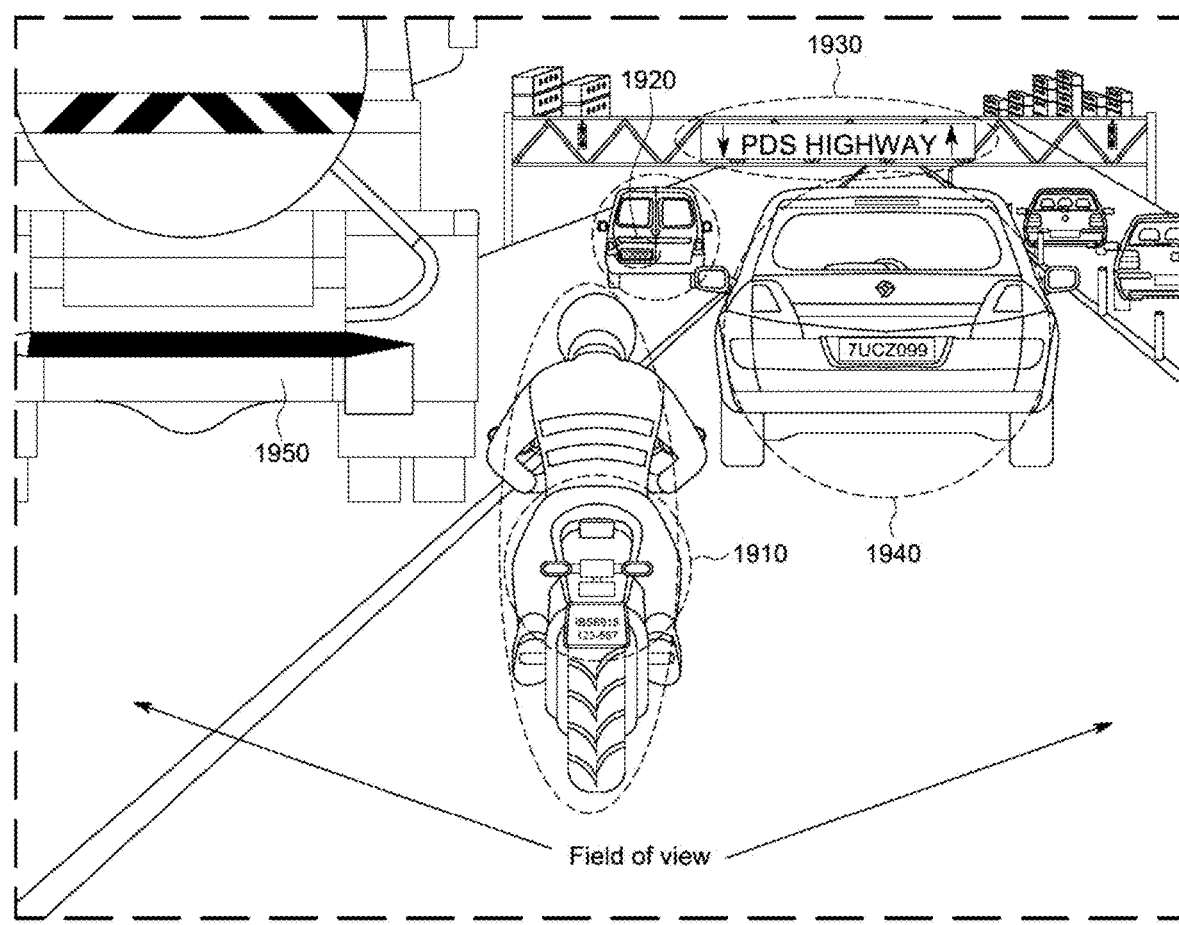
FIG. 19 is an example of a live scene that is viewed from an automobile camera, in accordance with some embodiments of the disclosure.

FIG. 19 is an example of a live scene that is viewed from an automobile camera, in accordance with some embodiments of the disclosure. In this embodiment, a live real-world scene is inputted via a camera associated with an automobile. Although a camera associated with an automobile is used as an example, the embodiment equally applies to any input camera associated with an AR device.

Processes 100 and/or 500 may be applied to the live scene that is viewed from an automobile camera. The processes 100 or 500 may be implemented, in whole or in part, by systems or devices such as those shown in FIGS. 2-3, to analyze the live scene and determine a winning trigger object and a winning bid price.

In this embodiment, the live scene that is viewed from an automobile camera depicts a motorcycle 1910, a plurality of cars of which cars identified by reference numbers 1920 and 1940 may be offered as potential trigger objects, a highway sign 1930, and a big truck 1950. Although there may be several other objects such as buildings far away, the steel frame on which the highway sign is posted, cones on the right side of the street, which may all be potential trigger objects, the control circuitry may limit the number of objects in the live scene that are potentially usable as trigger objects so as not to overload the viewer of the scene with advertisements.

It can also be noted, based on the live scene, that the closest objects in the FOV of the camera associated with the automobile are the motorcycle 1910 and the car 1940. The objects that are farther away include the car 1920 and the highway sign 1930. In order for advertisers who select trigger objects 1920 and 1930 to win their bid for advertising, they may have to increase their price, or boost their price, by a level that overcomes their disadvantage of selecting an object that is farther away and at a wider angle than objects 1910 and 1940, which are closer and at a central focal point from the FOV of the camera associated with the automobile. On the other hand, advertisers who select trigger objects 1910 and 1940 to win their bid for advertising may be fine with a lower bid amount since their selected trigger objects are closer in distance and closer to the central focal point from the FOV of the camera associated with the automobile. All attributes described in FIG. 10 and at block 102 of FIG. 1A and block 525 of FIG. 5 may be taken into consideration and used in the equations and formulas described at blocks 104-107 of FIG. 1A and blocks 530-540 of FIG. 5 to determine which trigger object and bid price offered from the advertisers may become the winner.

Once a winning trigger object and a winning bid price are selected, the control circuitry may determine the safety risks involved in placing the content item, such as an ad, on top of (e.g., overlayed on) the winning trigger object at the current time. As depicted in the figure, there may currently be heavy traffic neighboring the automobile that is being driven. As such, a probability of 63%, as an example, may be calculated by an AI engine analyzing the scene as the probability of the automobile being in an accident. Since the motorcycle driver is very close in proximity and potentially stopping and breaking every second, the probability of an accident may further increase to a higher number. The control circuitry may compare the probability of an accident against a safety threshold and determine if the probability is higher than the predetermined safety threshold. In this example, if a safety threshold is set at 23%, then any probability of an accident or a safety risk percentage that is higher than 23% would result in the content item (e.g., ad) not being placed on top of the trigger object at the current time. Since the current probability of an accident is at 63%, i.e., above the 23% predetermined safety threshold, the ad will not be placed on the trigger object at the current time. The control circuitry may continue to monitor the traffic and the safety risks in real time, and as the safety risks decrease and the probability of an accident goes below 23%, then it may automatically place an ad if the trigger object is still within a predetermined distance of when it was originally evaluated for placing the ad. If the trigger object has moved farther away or at an angle that is beyond a predetermined distance or angle of when it was originally assessed, then the control circuitry may perform the analysis again based on the new location of the trigger object selected or select a different trigger object.

Figure 20:
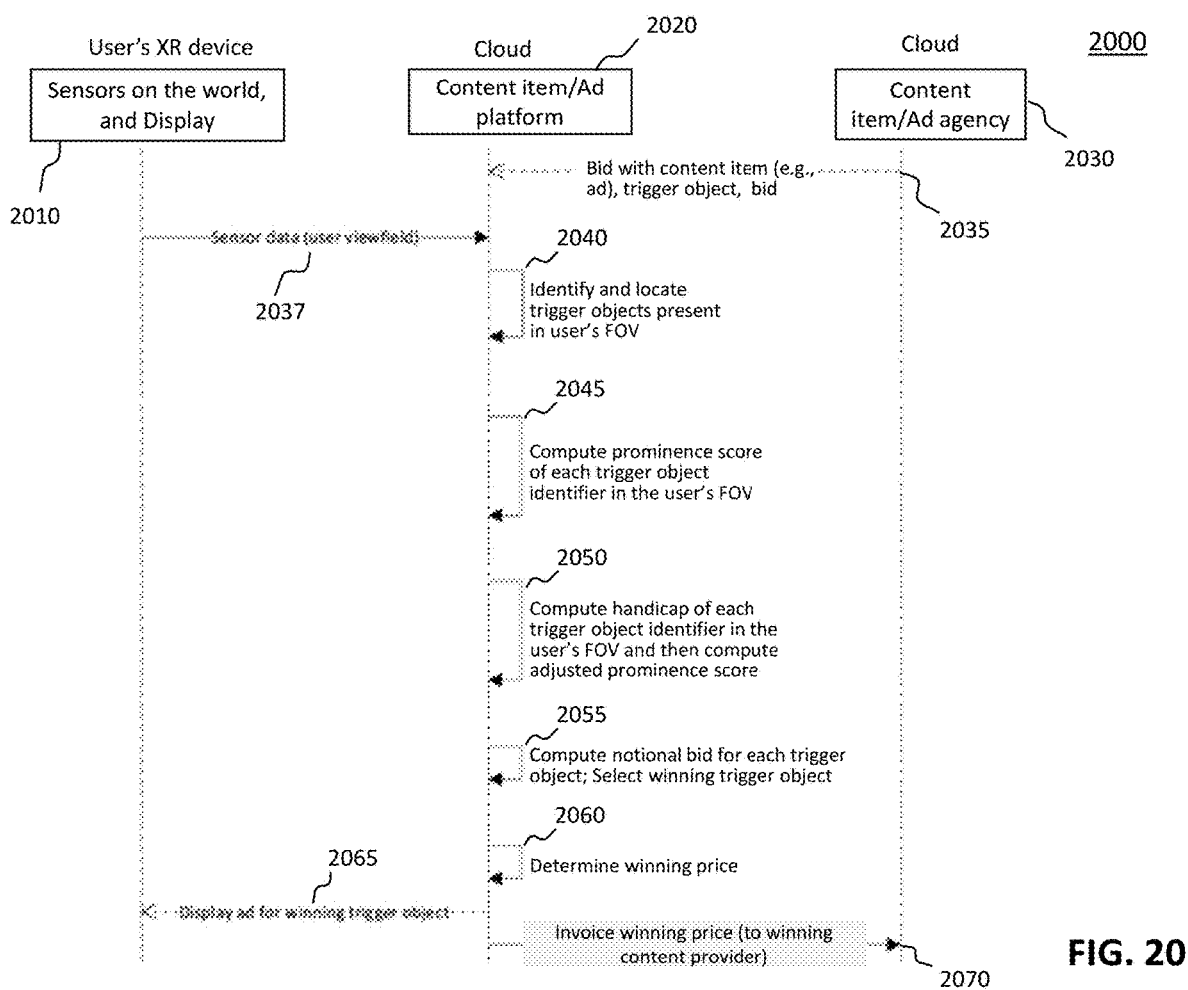
FIG. 20 is an example of communications between an XR device, content item/ad platform, and content item/ad agency/advertiser to determine a winning target object and winning bid for ad placement, in accordance with some embodiments of the disclosure.

FIG. 20 is an example of a process of communications between an XR device such as an AR device, an ad platform, and an ad agency/advertiser to determine a winning target object and winning bid for ad placement, in accordance with some embodiments of the disclosure. Although an ad and an ad agency are used to describe the process, the embodiments are not so limited. The embodiments and the processes described herein include any form of content item and content provider.

The process 2000 may be implemented, in whole or in part, by systems or devices such as those shown in FIGS. 2-3. One or more actions of the process 2000 may be incorporated into or combined with one or more actions of any other process or embodiments described herein. The process 2000 may be saved to a memory or storage (e.g., any one of those depicted in FIGS. 2-3) as one or more instructions or routines that may be executed by a corresponding device or system to implement the process 2000.

In some embodiments, a user's AR device 2010, ad platform 2020, and ad agency (or another type of advertiser) 2030 may communicate with each other to determine a winning target object and winning bid for ad placement.

In some embodiments, the ad agency 2030 submits a bid with an ad, as depicted at 2035. The bid includes the bid price, also referred to as the offer, and a trigger object identified by the ad agency on which they propose to display their ad.

The augmented reality device 2010 uses its sensors and camera to obtain real-world input of a live scene. This real-world input, which is sensor data that includes data relating to objects that are visible via the FOV of its camera, is then transmitted at 2037 to the ad platform 2020, which may be in the cloud.

At 2040, the ad platform 2020 identifies and locates trigger objects, based on the sensor data received from the user's augmented device 2010, that are visible in the FOV (or in a viewfinder) of the augmented device.

At 2045, the ad platform 2020 computes a prominence score of each trigger object identified at 2040. The prominence score is computed by applying the formula $$P = \frac{S}{(V*D)}.$$

At 2050, the ad platform 2020 computes a handicap of each trigger object identified at 2040. This is also referred to as the vantage score in other embodiments, which is computed by applying the formula $V = \sqrt{\text{ApparentObjectArea}}$. Based on the computed prominence score and the handicap (vantage score), the ad platform 2020 computes an adjusted prominence score by applying the formula:

$$AP = \frac{P}{V}.$$

At 2055, the ad platform 2020 selects a winning trigger object. To select the winning trigger object, the ad platform 2020 computes the notional bid for each trigger object. Examples of calculating this notional bid are depicted in FIGS. 15, 16, and 18. This calculation involves applying the formula Bid price×Adjusted prominence score of the trigger object=Notional bid. For example, the notional bid of object A in FIG. 15 is calculated to be 8 (bid price)×9.1 (adjusted prominence score)=72.76 or 72.8 if rounded to a single decimal. Once notional bids of all the trigger objects are computed, the trigger object with the highest notional score is selected as the winner.

At 2060, the ad platform 2020 selects a winning bid price. To do so, the ad platform may apply the following formula:

$$\left[\frac{2^{nd} \text{ highest bid} \times AP}{\text{Winner } AP}\right] + \text{Bid increment}.$$

Some examples of calculating this winning bid price are depicted in FIGS. 15, 16, and 18, at row 14 of each figure.

Once the winning trigger object and winning bid price are selected at 2055 and 2060, the ad platform at 2065 transmits the ad that is to be placed on the winning trigger object to the AR device 2010. Barring any safety risks and any rule or policy restrictions for ad placement, such as those described in block 103 of FIG. 1A, blocks 510-515 and 545 of FIG. 5, and all of FIG. 12, the ad is displayed on the winning trigger object in any one of the formats described in relation to FIG. 13.

At 2070, the invoice with the winning bid price is transmitted by the ad platform 2020 to the ad agency 2030.

Figure 21A:
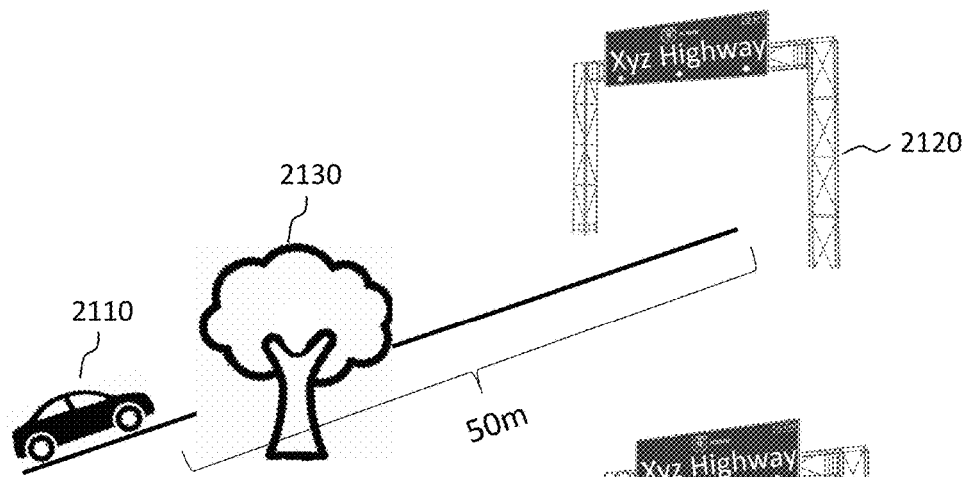
FIGS. 21A and 21B are examples of using XR device movement to anticipate displaying a content item on a trigger object, in accordance with some embodiments of the disclosure.
Figure 21B:
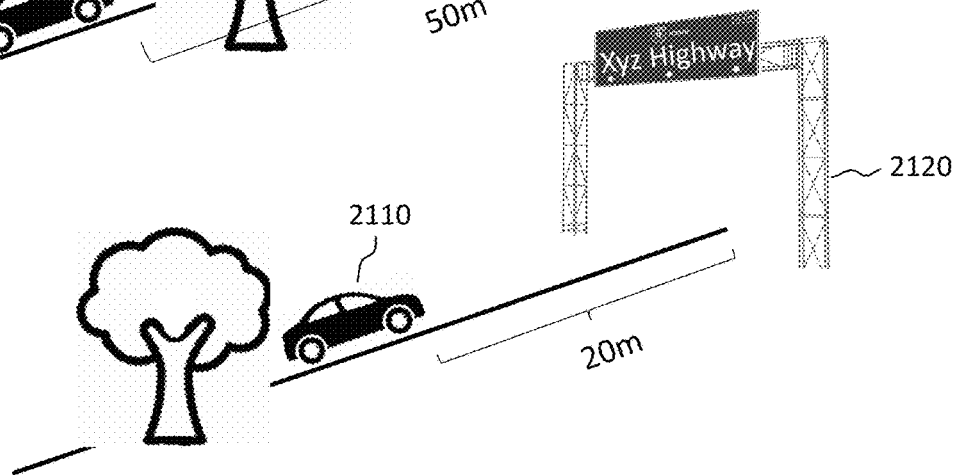

FIGS. 21A and 21B are examples of using XR device movement to anticipate displaying a content item on a trigger object, in accordance with some embodiments of the disclosure.

The processes described in FIGS. 1A, 5, and 20 may be applied to trigger objects that are currently visible, or prominent, or trigger objects that may be visible and prominent based on the XR device's motion. In a non-limiting example, FIGS. 21A and 21B are used to describe the motion of an automobile 2110 on a highway towards Xyx highway sign 2120. As depicted, the automobile 2110 is 50 meters away from highway sign 2120 in FIG. 21A and has moved closer to the highway sign 2120 in FIG. 21B, e.g., is 20 meters from the highway sign.

In some embodiments, the control circuitry 220 and/or 228 may be able to anticipate that a trigger object that is currently far away may become closer to the moving XR device based on the motion of the XR device. For example, if the XR device is embedded in the automobile 2110, or a passenger in the automobile is wearing the XR device, then the control circuitry 220 and/or 228 may be able to obtain the automobile 2120 speed and anticipate that the highway sign 2120 will be 30 meters closer in X seconds/minutes based on the speed of the automobile. Anticipating the distance of the highway sign based on automobile speed, and other factors, the control circuitry 220 and/or 228 may present the highway sign as a viable trigger object that may be used to place a content item. The control circuitry 220 and/or 228 may anticipate and calculate the prominence, vantage, and adjusted prominence scores of the highway sign when the automobile will be closer to the highway sign, i.e., at a future time based on the automobile speed.

Likewise, in some embodiments, another object may be obstructing the view of a trigger object and such obstruction may be removed once the XR device has travelled a certain distance. For example, a tree 2130 may have been obstructing the view of the highway sign 2120 from the automobile 2120 in FIG. 21A, however, once the automobile 2120 travels a certain distance, e.g., 30 meters, it may have passed the tree and have an unobstructed view to the highway sign 2120. The control circuitry 220 and/or 228 may obtain GPS, satellite images, maps, such as Google™ maps, and other images, such as those posted by traffic platforms, such as Waze™, or other users, to determine what trigger objects may fall along the path of the automobile. The control circuitry 220 and/or 228 may then use such data to anticipate which trigger objects may appear and at what time, e.g., based on the speed of the automobile, to then use such objects as trigger objects for placing a content item. For example, if the automobile is travelling at a certain speed and it may pass a certain building or billboard in four minutes (based on automobile speed and traffic patterns analyzed by the control circuitry 220 and/or 228), then the certain building or billboard may be presented as a viable trigger object, even if the trigger object is currently not in the FOV of the XR device.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for controlling an extended reality (XR) device to display a content item in an XR environment comprising:
    identifying a first trigger object and a second trigger object in the XR environment within a field of view of the XR device;
    determining a first value associated with displaying a first digital content item overlayed on the first trigger object;
    determining a second value associated with displaying a second digital content item overlayed on the second trigger object;
    determining, for the first trigger object, a first prominence score and a first vantage score;
    determining, for the second trigger object, a second prominence score and a second vantage score;
    calculating, based at least in part on the first prominence score and the first vantage score, a first adjusted prominence score for the first trigger object;
    calculating, based at least in part on the second prominence score and the second vantage score, a second adjusted prominence score for the second trigger object;
    selecting the first trigger object, wherein the selecting is based at least in part on the first adjusted prominence score, the second adjusted prominence score, the first value, and the second value; and
    controlling the XR device to display the first digital content item over the selected first trigger object in the XR environment.

2. The method of claim 1, further comprising:
    determining that the display of the first digital content item overlayed on the selected first trigger object would satisfy digital content item placement criteria; and
    in response to determining that first digital content item would satisfy the digital content item placement criteria, controlling the XR device to display the first digital content item overlayed on the selected first trigger object in the XR environment.

3. The method of claim 2, further comprising:
    determining that the display of a second digital content item overlayed on the second trigger object would violate a digital content item placement criterion; and
    selecting the first trigger object based on the violation of the digital content item placement criteria by the display of the second digital content item overlayed on the second trigger object.

4. The method of claim 1, further comprising:
selecting the second digital content item for overlaying on the second trigger object, wherein the selecting is based at least in part on the second adjusted prominence score, the first adjusted prominence score, the second value, and the first value; and
determining whether display of the second digital content item overlayed on second trigger object would cause a safety risk.

5. The method of claim 4, further comprising, in response to determining that the display of the second digital content item overlayed on second trigger object would not cause the safety risk, controlling the XR device to display the second digital content item overlayed on second trigger object in the XR environment.

6. The method of claim 4, further comprising executing a remedial action, in response to determining that the display of the second digital content item overlayed on second trigger object would cause the safety risk.

7. The method of claim 6, wherein the remedial action is delaying the overlaying of the second digital content item on the second trigger object until the safety risk is cleared.

8. The method of claim 1, wherein calculating the first adjusted prominence score for the first trigger object comprises dividing the first prominence score by the first vantage score to obtain the first adjusted prominence score.

9. The method of claim 8, wherein the first vantage score is a measure of impact of a size of the first trigger object on its visibility from a field of view (FOV) of the XR device.

10. The method of claim 1, further comprising:
displaying, on a user interface, the first trigger object and the second trigger object, wherein the first and second trigger objects are a subset of trigger objects, from a plurality of trigger objects, that have been made available for selection to display a digital content item; and
displaying digital content item restrictions associated with each displayed trigger object from the subset of trigger objects on the user interface.

11. The method of claim 1, further comprising:
calculating aggregate values for the first trigger object and the second trigger object;
comparing the aggregate values for the first trigger object and the second trigger object; and
selecting the first trigger object based on the first trigger object having a higher aggregate value than the second trigger object.

12. The method of claim 11, wherein the aggregate value of the first trigger object or the second trigger object is calculated based at least in part on the first adjusted prominence score, the second adjusted prominence score, the first value, and the second value.

13. A system for controlling an extended reality (XR) device to display a content item in an XR environment, the system comprising:
communications circuitry configured to access an XR device; and
control circuitry configured to:
identify a first trigger object and a second trigger object in the XR environment within a field of view of the XR device;
determine a first value associated with displaying a first digital content item overlayed on the first trigger object;
determine a second value associated with displaying a second digital content item overlayed on the second trigger object;
determine, for the first trigger object, a first prominence score and a first vantage score;
determine, for the second trigger object, a second prominence score and a second vantage score;
calculate, based at least in part on the first prominence score and the first vantage score, a first adjusted prominence score for the first trigger object;
calculate, based at least in part on the second prominence score and the second vantage score, a second adjusted prominence score for the second trigger object;
select the first trigger object, wherein the selecting is based at least in part on the first adjusted prominence score, the second adjusted prominence score, the first value, and the second value; and
control the XR device to display the first digital content item overlayed on selected first trigger object in the XR environment.

14. The system of claim 13, further comprising the control circuitry configured to:
determine that the display of the first digital content item overlayed on selected first trigger object would satisfy digital content item placement criteria; and
in response to determining that first digital content item would satisfy the digital content item placement criteria, control the XR device to display the first digital content item overlayed on the selected first trigger object in the XR environment.

15. The system of claim 14, further comprising, the control circuitry configured to:
determine that the display of a second digital content item overlayed on the second trigger object would violate a digital content item placement criterion; and
select the first trigger object based on the violation of the digital content item placement criteria by the display of the second digital content item overlayed on the second trigger object.

16. The system of claim 13, further comprising the control circuitry configured to:
select the second digital content item for overlaying on the second trigger object, wherein the selecting is based at least in part on the second adjusted prominence score, the first adjusted prominence score, the second value, and the first value; and
determine whether display of the second digital content item overlayed on the second trigger object would cause a safety risk.

17. The system of claim 16, further comprising, in response to determining that the display of the second digital content item overlayed on the second trigger object would not cause the safety risk, the control circuitry configured to control the XR device to display the second digital content item overlayed on the second trigger object in the XR environment.

18. The system of claim 16, further comprising the control circuitry configured to execute a remedial action, in response to determining that the display of the second digital content item overlayed on the second trigger object would cause the safety risk.

19. The system of claim 13, wherein the first prominence score is a measure of visibility of the first trigger object from a field of view (FOV) of the XR device.

20. The system of claim 13, further comprising the control circuitry configured to:
display, on a user interface, the first trigger object and the second trigger object, wherein the first and second trigger objects are a subset of trigger objects, from a plurality of trigger objects, that have been made available for selection to display a digital content item; and display digital content item restrictions associated with each displayed trigger object from the subset of trigger objects on the user interface.

\* \* \* \* \*